June 11, 1963

W. J. KARPLUS 3,093,731

TRANSIENT FIELD SIMULATOR

Filed Sept. 10, 1959

INVENTOR
Walter J. Karplus

Attorneys,

June 11, 1963  W. J. KARPLUS  3,093,731
TRANSIENT FIELD SIMULATOR
Filed Sept. 10, 1959  8 Sheets-Sheet 2

INVENTOR
Walter J. Karplus
Attorneys,

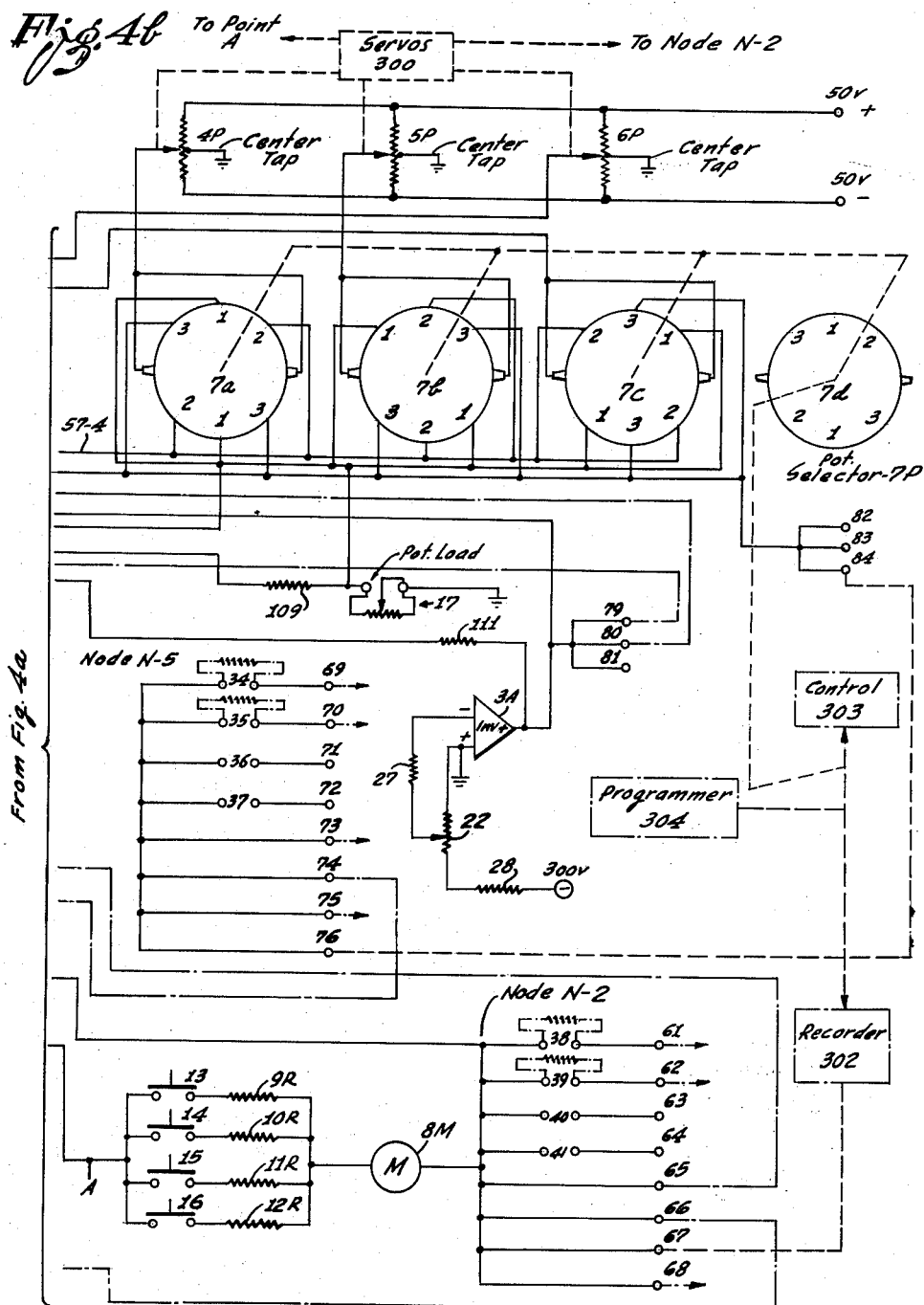

June 11, 1963 W. J. KARPLUS 3,093,731
TRANSIENT FIELD SIMULATOR
Filed Sept. 10, 1959 8 Sheets-Sheet 5
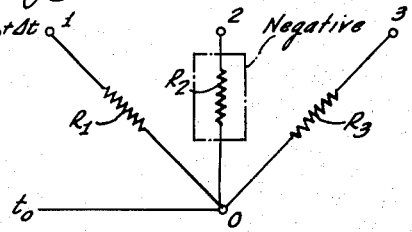
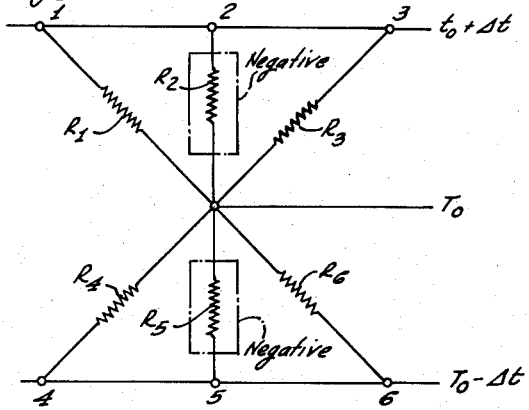
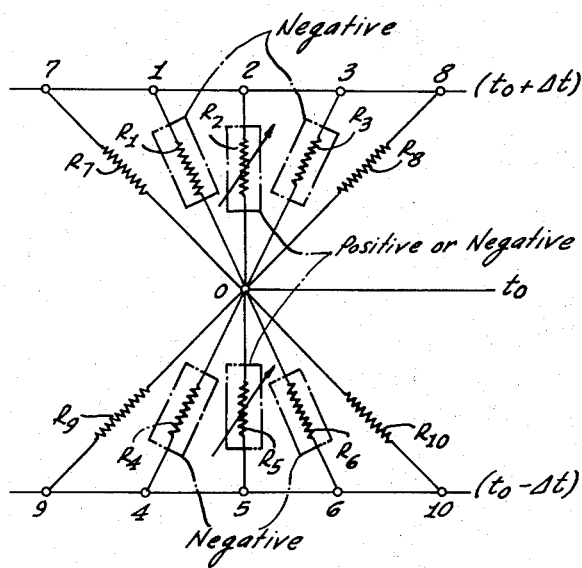
INVENTOR
Walter J. Karplus
Attorneys, Fig. 10
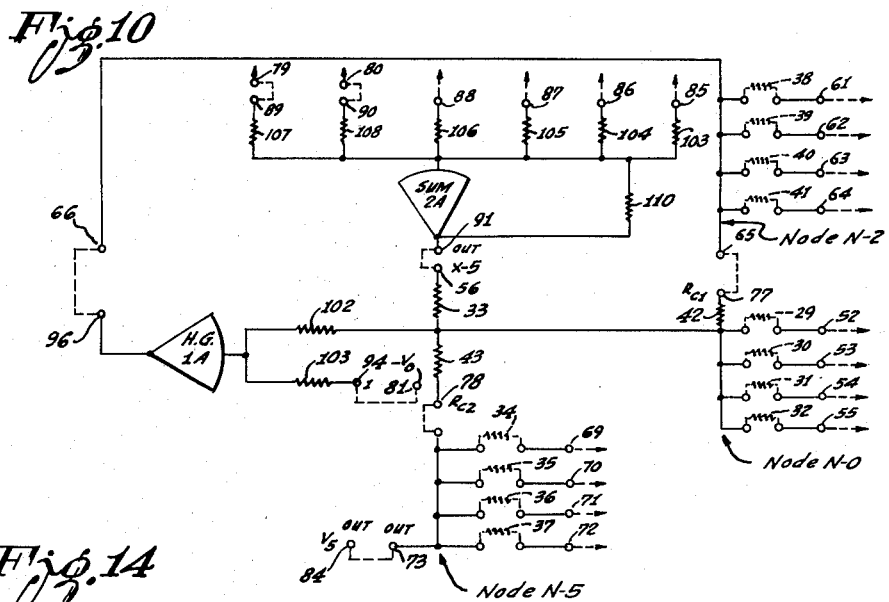
Fig. 14
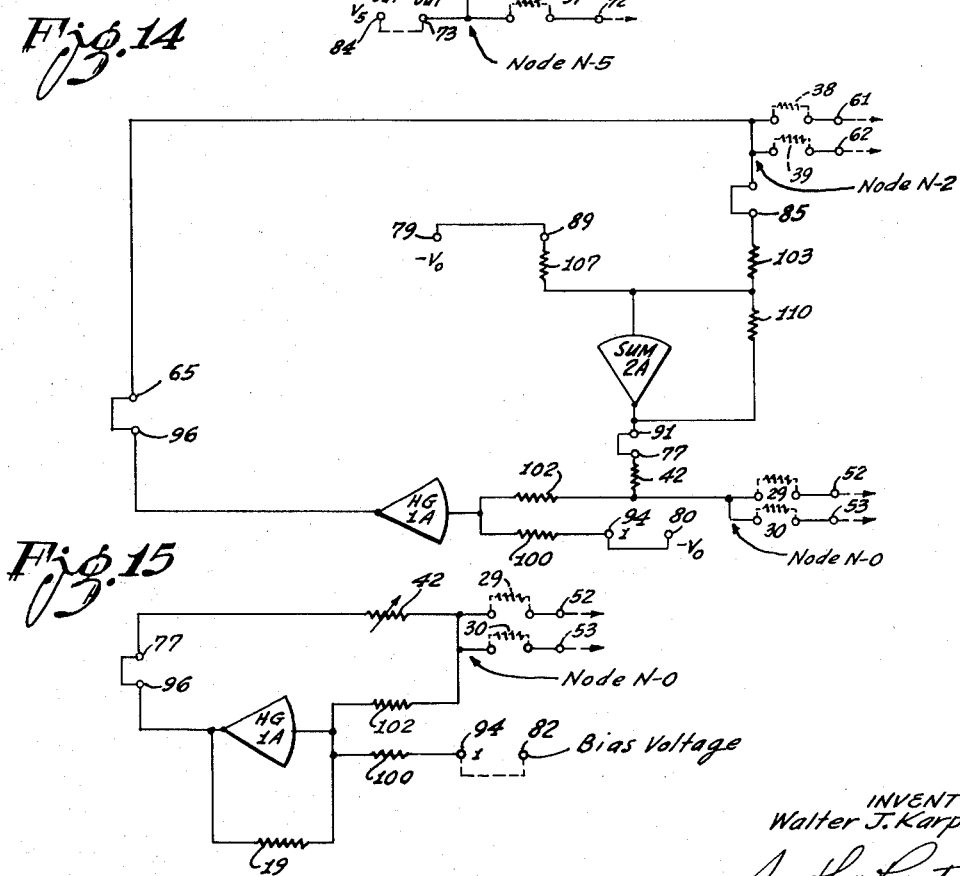
Fig. 15
INVENTOR
Walter J. Karplus
Attorneys June 11, 1963  W. J. KARPLUS  3,093,731
TRANSIENT FIELD SIMULATOR
Filed Sept. 10, 1959  8 Sheets-Sheet 8
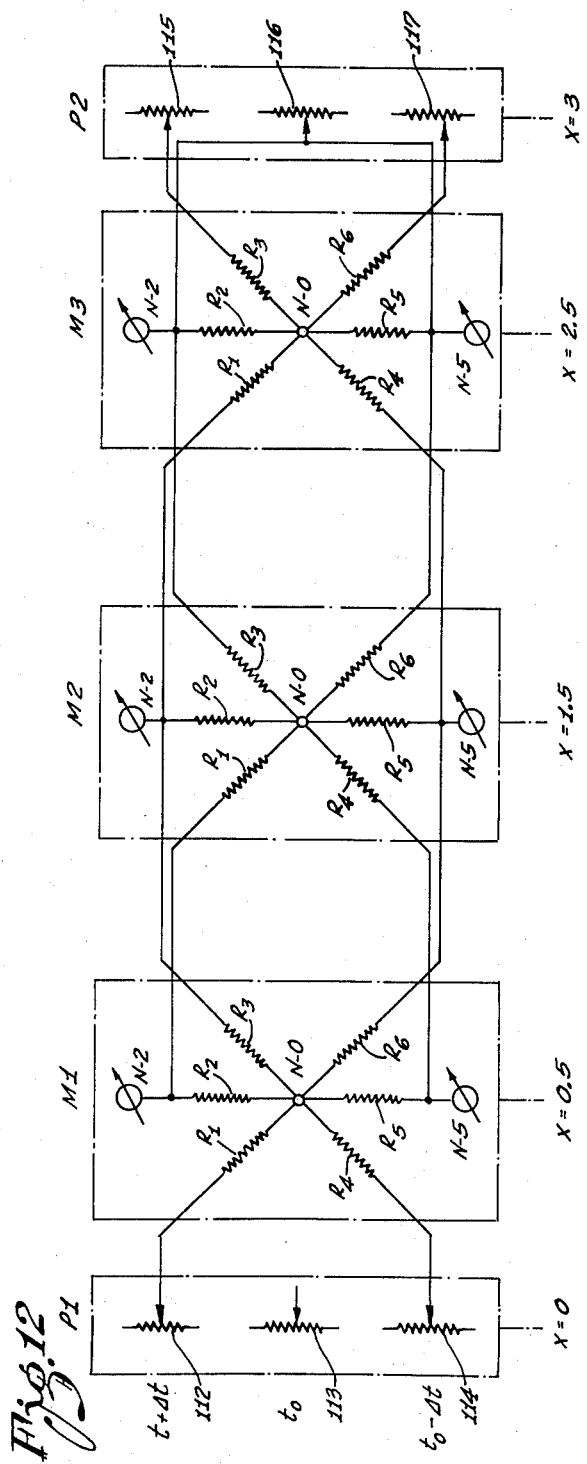
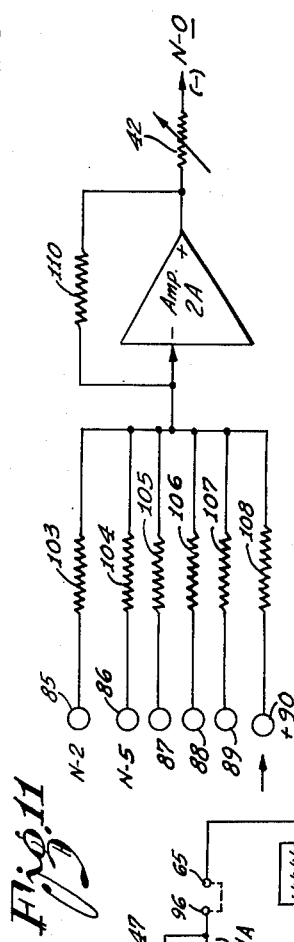
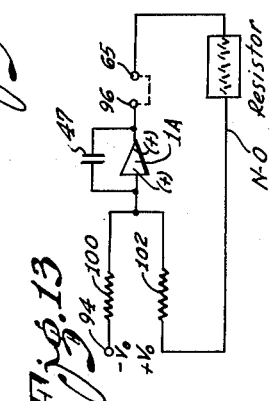
INVENTOR
Walter J. Karplus
Attorneys United States Patent Office 3,093,731
Patented June 11, 1963

3,093,731
TRANSIENT FIELD SIMULATOR
Walter J. Karplus, 7450 Palo Vista Drive,
Los Angeles 46, Calif.
Filed Sept. 10, 1959, Ser. No. 839,160
22 Claims. (Cl. 235—185)

This invention relates to an analog computer and, more particularly, to an analog computer in the form of a network-type simulator for solving transient field problems.

The distinctive feature of a field problem is that spatial dimensions as well as time comprises an integral part of the formulation and solution of the problem. In a field problem, mathematically speaking, location in space is characterized by additional independent variables; the space coordinates, whereas in a lumped characteristic system, time is the only independent variable. In other words, if the location of the point or position under study within a region of space, or a field, is required in order to determine its characteristics as it changes with time, a field problem is involved.

Since there is more than one independent variable, the relation between the dependent and independent variables in a transient field problem is expressed by a partial differential equation. The network-type simulator of this invention may be utilized to solve any of the partial differential equations which characterize transient field problems.

Field problems which occur in physics and engineering are generally second or fourth order differential equations. Though the computer of this invention can solve any second or fourth order differential equation which has real coefficients for the space variables, it is particularly suited for solving transient field problems in which the dependent variable also varies with time. The real co-efficients indicate that the problem is realistic in that it occurs in nature. With regard to derivatives with respect to time, only first and second derivatives occur in transient field problems and the computer of this invention does not readily solve equations of higher order time derivatives. To recapitulate with the above brief mathematical background in mind, this invention relates particularly to an analog computer for solving any of the transient field problems which occur in nature.

Some of the most widely occurring partial differential equations in which the dependent variable varies non-periodically with time are the diffusion equation, the wave equation and the biharmonic or elasticity equation. These equations are described in some detail in the book "Analog Simulation" written by Walter J. Karplus and published in 1958 by the McGraw Hill Book Company Incorporated, New York.

The solution of partial differential equations can be effected by one of two general techniques: analytical or numerical. Analytical techniques involve the treatment of the problem by standard mathematical methods and generally provide solutions in the form of infinite series. These methods are limited to problems in which the geometry of the field is relatively simple and in which the field parameters are linear and do not vary with time. Even if these conditions are met, solutions are still difficult to obtain and are not generally in a form which is suitable for immediate application. For these reasons, more and more emphasis has been placed in recent years upon numerical methods for the solution of partial differential problems.

Numerical methods provide solutions only for a specific set of parameters, boundary values, initial values, etc. Automatic computers are usually employed to perform the detail calculations required to obtain such solutions.

Two broad types of computer approaches utilizing numerical methods for the solution of the field problems exist: digital and analog. The distinction between digital and analog computers lies in the manner in which the dependent variable of the problem is handled within the computer. In digital computers all dependent variables are in discrete or digitized form, while in analog equipment, they are in continuous form. The independent variables space and time are always in discrete form in a digital computer, while they may be either continuous or discrete in the case of an analog computer.

The chief advantage of digital computers over analog computers is their accuracy. The accuracy of digital solutions is limited, of course, by the number of significant figures carried in the solution which is, in turn, determined by the memory capacity of the computer. In the case of analog equipment, the accuracy is limited by the quality of the computer components and rarely exceeds 0.05 percent. In the treatment of transient field problems by digital techniques, a particular difficulty arises because it is necessary to replace all the partial derivatives by finite difference approximations so that the solution requires only the algebraic operations of addition and subtraction. A finite difference approximation is an approximation of the derivative. In the approximation the variable changes by discrete steps. The finite difference approach, therefore, involves inherently replacing the distributed system, or continuous field, by a group of lumped elements which together substantially duplicate the characteristics of the field.

There are two types of finite difference operations which are possible: explicit and implicit approximations. In the case of an explicit approximation, the dependent variable, which will be hereafter referred to as a potential at a given point in the field and at a given time, is expressed entirely in terms of field potential existing at preceding time increments all of which are known. On the other hand, in explicit formulations, the expression for the dependent variable or field potential at a specific point in the field at a given time contains terms involving field potentials to the points in space at the said instant of time with the other field potentials being also unknown. To apply an implicit approximation, therefore, to solve a partial differential equation, the solutions of a large set of simultaneous differential equations at each time increment is required. The large number of arithmetical operations required for this method may cause the time required to solve such field problems to be quite long and often impractical.

Explicit approximation efforts for formulating the finite difference approximation of the partial differential equation do not require such elaborate calculations at each time increment, but the difficulty of computational instability arises in this method. With computational instability the roundoff error of the digital equipment builds up as the computation progresses until the error term overshadows the solutions making it worthless. Explicit finite difference approximations lead to computational instability unless the ratio of the time increment to the space increment is smaller than a critical value. This requirement to avoid instability makes it necessary to proceed in relatively minute time steps so that frequently an impractically large number of time steps must be taken to cover a specified period of time. Therefore, by both the implicit and the explicit methods of finite difference approximation, the digital computer treatment of transient field problems often involves a cumbersome operation and, hence, relatively long solution times.

The conventional treatment of transient field problems by analog techniques is performed either by means of network analyzers or by differential analyzers. In both methods, only the space derivatives are replaced by finite difference approximations while the time variable is maintained in continuous form. Network analogs for each of the partial differential equations characterizing a transient field problem heretofore have required reactive components. The utilization of reactance network analyzers suffers a number of important disadvantages. First, reactors of magnitudes depending upon the parameters applicable to the specific problem are required at each node of the network. Suitable continuously variable capacitors and inductors are unavailable so that a large assortment of fixed reactors must be supplied. Sufficiently precise and sufficiently High-Q reactors are expensive. Moreover, since the time variable of the problem is continuous, it is necessary to effect all parameter changes that vary with time while the solution progresses and at precisely the correct rate. The simulation of fields with non-constant parameters is, therefore, generally impossible with the conventional network analyzers. Further special conditions such as moving special coordinates or the melting or vaporization of heat conducting medium in the transfer of heat problems present additional serious difficulties for the network analyzer simulation. For these reasons, conventional computers, either analog or digital, present serious disadvantages when applied to the solution of transient field problems.

In a specific illustrative embodiment of this invention, a computer in the form of a general purpose transient field simulator is provided which can solve any of the transient field problems which occur in nature. In particular, problems governed by the diffusion equation, the wave equation and the bi-harmonic or elasticity equation and modified forms of these equations may readily be solved. The solutions are achieved in a relatively short time without any possibility of computational instability.

Features of this invention relate to the provision of a network type simulator in which time as well as the space variables are approximated by finite difference expresions so that solutions are obtained in discrete steps of time. Only implicit finite difference equations are utilized so that computational instability does not occur regardless of the size of the time increment, and reactances either capacitive or inductive are not utilized so that a relatively inexpensive and flexible apparatus is achieved.

The simulator includes a number of similar node modules which are coupled together to simulate the conditions in the transient fields. Each of the modules includes a plurality of positive and negative resistive components, and switching means for interconnecting the positive and negative resistors in an array which is an electrical analog of the field. The switching means is set in accordance with the particular problem to be solved and different arrays result for each setting. The resistors are readily changeable or adjustable with the values being determined by the parameters and net spacings of the particular problem being solved.

Each of the node modules is then a highly flexible circuit arrangement which is set in a particular array with the components utilized in the array having particular values. The array and the values of the components are both determined by the problem to be solved. The array in each node module is in the form of three circuit nodes representing the characteristic of a point in the field at three successive time epochs. The operation of the computer is such that knowing the initial characteristics of the points in the field, it automatically adjusts the potentials at the circuit nodes representing succeeding time epochs so that the potentials represent the characteristics of the points at the succeeding time epochs.

Connecting means interconnect the modules with each other and with boundary condition determining circuits. The particular connections provided by the connecting means is also selected in accordance with the particular problem to be solved.

The operation of the computer is a stepping operation and the determined potentials which represent point characteristics at particular time epochs, are utilized in succeeding operating steps of the computer. The operation is then a stepped cyclical operation with the node modules being operated together step by step and with each step representing a time epoch after the initial time epoch.

To briefly illustrate the step-by-step operation, a typical problem is a vibrating string problem, with the required solution being the displacement of particular points on the string. The boundary condition determining circuits are set to determine the conditions at the ends of the string and a chain of node modules, each representing a point on the string, are interconnected between the determining circutis. The node modules are then operated step-by-step to provide potentials indicating the displacement of the respective points on the string at succeeding time epochs.

Further features of this invention relate to the provision of three amplifier means in each node nodule. One amplifier means provides for the simultaneous adjustment of the unknown potentials at the node circuits. The second amplifier means forms part of the negative resistor utilized in the array, and the third amplifier functions as an inverter to establish accurate polarities of the simulating potentials at the node circuits.

Still other features pertain to means for automatically operating the node modules to successively determine the field potentials. The automatic operating means includes self balancing servos for adjusting the potentials at the three node circuits.

Further advantages and features of this invention will become apparent upon consideration of the following description when read in conjunction with the drawing wherein.

Figure 8:
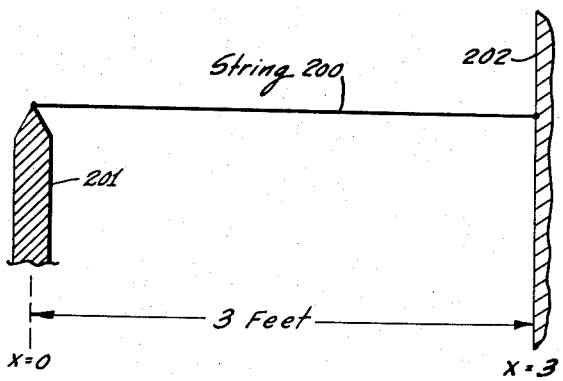
Figure 4A:
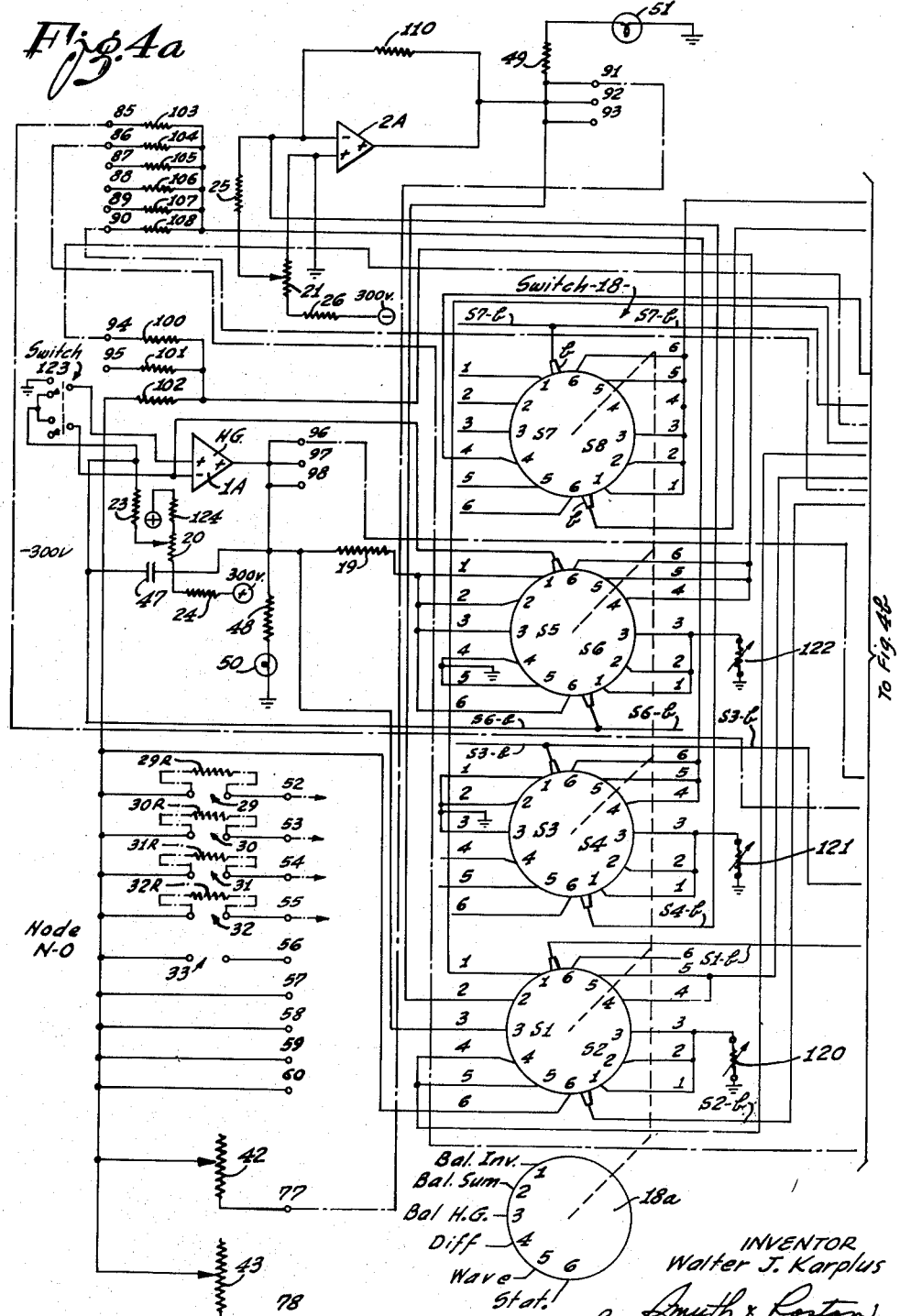
Figure 9:
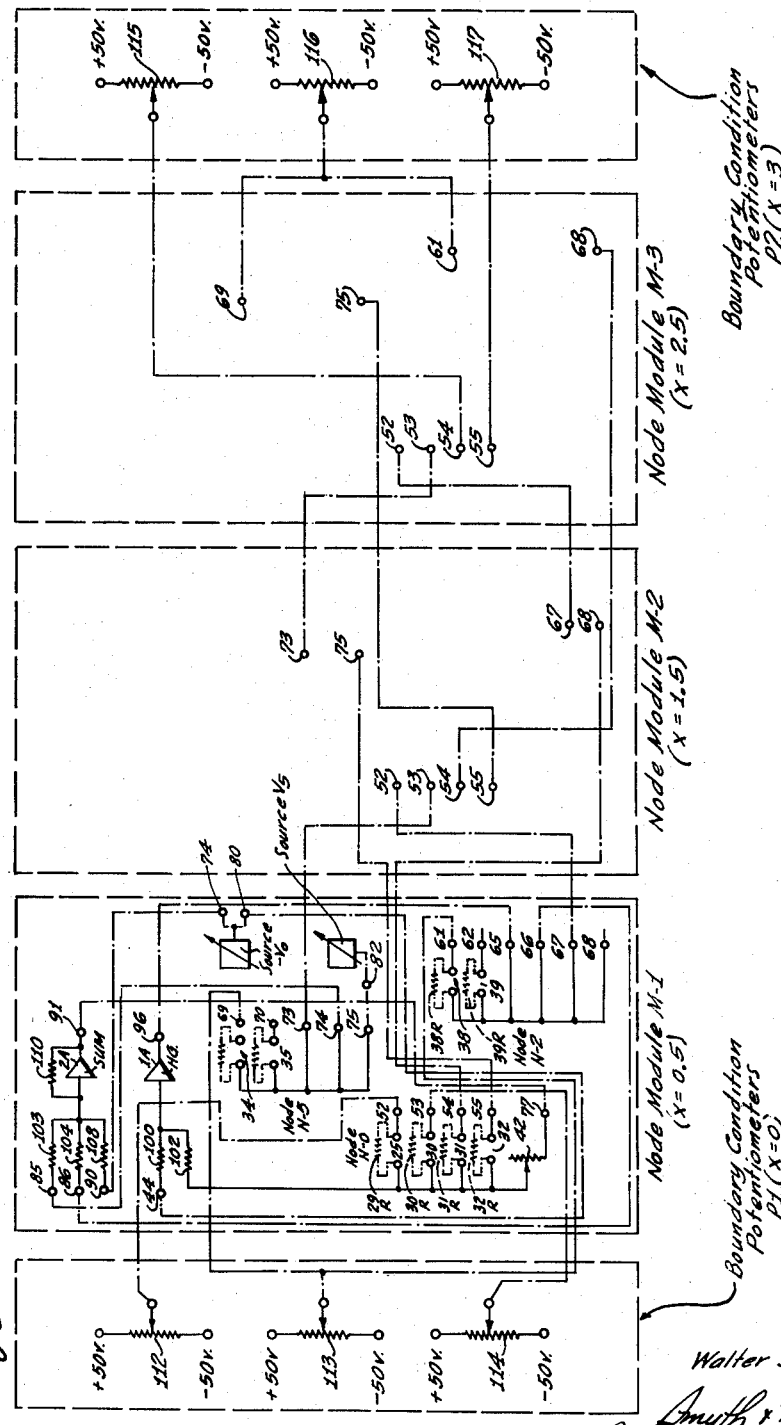

FIGURES 4a and 4b, with FIGURE 4b arranged to the right of FIGURE 4a, are a partial functional and partial circuit representation of the general purpose node-module utilized in the computer of this invention;

FIGURE 5 is a simplified functional representation of the node-module illustrating the main circuit components utilized for solving the diffusion equation;

FIGURE 6 is a simplified functional representation of the node-module illustrating the main circuit components utilized for solving the wave equations;

FIGURE 7 is a simplified functional representation of the node-module illustrating the main circuit components utilized for solving the bi-harmonic equation;

FIGURE 8 is a diagrammatic representation of a vibration string transient field problem;

FIGURE 9 is a simplified functional representation of the computer of this invention illustrating only the major components utilized to solve the vibrating string transient field problem;

FIGURE 10 is a simplified functional representation of the node-module illustrating the connections utilized for solving the bi-harmonic equation;

FIGURE 11 is a circuit representation of the negative resistance components utilized in the node module of this invention;

FIGURE 12 is a simplified functional representation of the main circuit components of a number of interconnected modules simulating the wave equation;

FIGURE 13 is a circuit representation of the automatic servo amplifier used in each node module of the invention;

FIGURE 14 is a simplified functional representation of the node module illustrating the connections utilized for solving the diffusion equation; and FIGURE 15 is a simplified functional representation of the node module illustrating connections for solving Poisson's equation.

Figure 1:
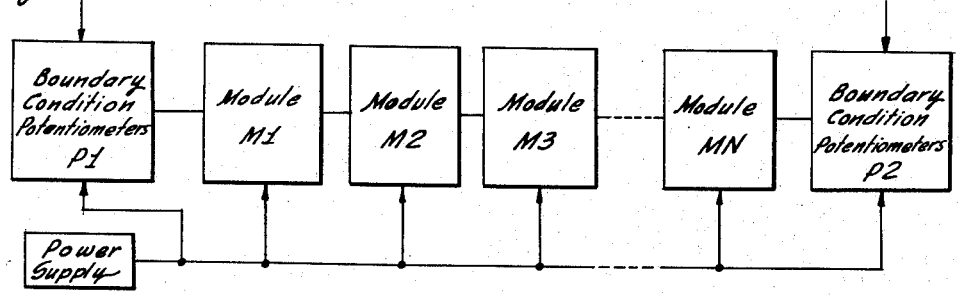
FIGURE 1 is a functional representation of the components of the computer of this invention which are utilized to solve a field problem formulated in one space dimension.
Figure 2:
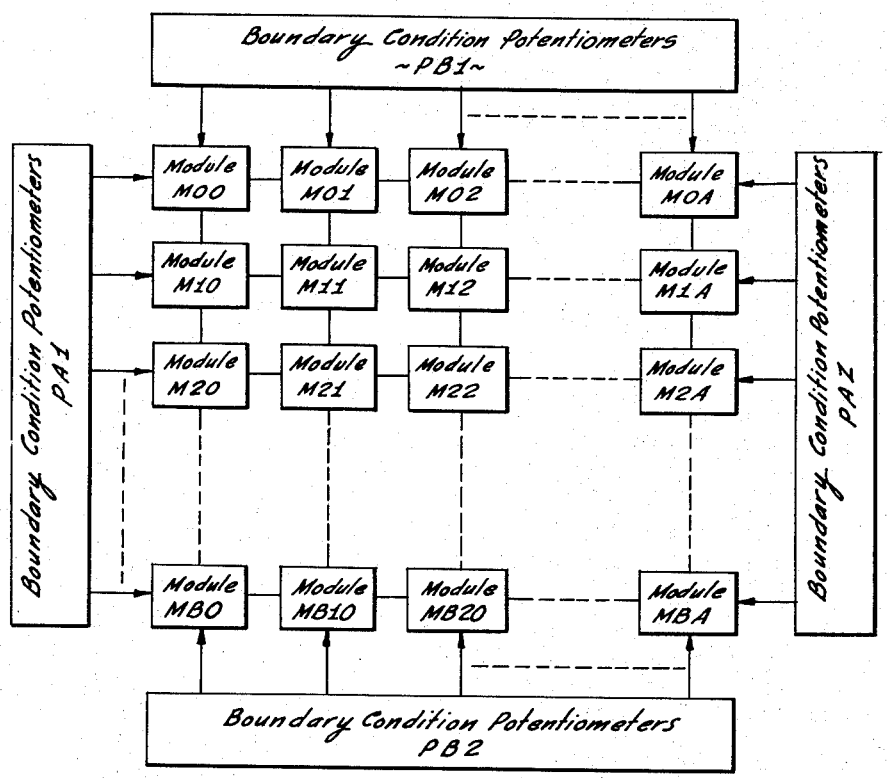
FIGURE 2 is a functional representation of the components of the computer of this invention which are utilized to solve a field problem formulated in two space dimensions.

The general purpose transient field simulator of this invention is functionally depicted in FIGURES 1 and 2, with FIGURE 1 illustrating the components utilized for solving a one-space dimensional problem and FIGURE 2 illustrating the components utilized for solving a two-space dimensional problem. The simulators shown in FIGURES 1 and 2 include respectively numbers of similar modules M1 through MN inclusive and M00 through MBA, inclusive. In FIGURE 1, the modules M1 through MN, inclusive, are coupled in a chain or series arrangement between two sets of boundary condition potentiometers P1 and P2, whereas in FIGURE 2 the modules M00 through MBA, inclusive, are arranged in a coordinate array between four sets of boundary condition potentiometers PA1, PA2, PB1 and PB2. The two dimensional simulator may be utilized for solving one dimensional problems merely by disconnecting or disabling all the modules except the modules in a single row or in a single column between two opposite sets of binary condition potentiometers.

The two-dimensional simulator depicted in FIGURE 2 may actually be part of a three-dimensional simulator with the node modules M00 through MBA being the modules in one plane. A three dimensional array of modules is utilized to solve three-space dimensional problems. Generally, however, three dimensional problems can be solved by first reducing them to two-dimensional problems in which the effects in one plane are representative of the other parallel planes so that the two-dimensional array is utilized. The general purpose simulator of this invention can be utilized, therefore, to solve one, two or three space dimension transient field problems.

Each of the modules M1 through MN and M00 through MBA is a flexible circuit arrangement which is hereinafter described in detail in reference to FIGURES 4a and 4b. Each of the modules represents the condition at a point in the field. Before proceeding with a description of the details and operation of a module, the type of problem which the simulator solves and the mathematical relationships which are utilized to set and operate the modules of the simulator are first briefly described.

TYPE OF PROBLEM

The simulator is particularly suited for the solution of transient field problems in which the dependent variable varies non-periodically with time, but is also suited to the determination of normal mode values. Ten of the most widely occurring time dependent partial differential equations which are utilized to solve transient field problems are briefly discussed below. These equations are utilized to solve problems in many different physical areas including electrodynamics, electrostatics, magnetics, electromagnetics, statics, dynamics, elasticity, fluid mechanics, particle diffusion and heat transfer. Generally, therefore, one of these equations would probably be utilized to solve any transient field problem in which the dependent variable varies nonperiodically with time. The present invention, however, it not restricted to the solution of these ten illustrative equations as any equation representing a field problem occurring in physics or engineering can be solved thereby.

Probably the most widely occurring time-dependent partial differential equation is the diffusion equation $$\nabla^2 \phi = K \frac{\partial \phi}{\partial t} \quad (1)$$

where $\phi$ is a potential function, for example, the temperature in a transient heat transfer problem, $\nabla^2$ is the Laplacian operator, and K is a field parameter or constant, corresponding, for example, to the reciprocal of the thermal-diffusivity in heat transfer problems. The dependent variable in each of the ten equations is referred to herein as the potential function regardless of the physical area in which the equation is applicable. For example, in heat transfer problems, the word potential designates temperature. For a single dimension problem, the Laplacian operator equals $\partial 2_\phi/dx2$, which is the second partial derivative of the potential with respect to the independent variable $x$ representing the single space dimension.

If the field is non-uniform, Equation 1 is written as $$\nabla(\sigma \nabla \phi) = K \frac{\partial \phi}{\partial t} \quad (2)$$

where $\sigma$ is a function of the space variables of the problem.

Occasionally, the problems governed by Equation 1, physical mass transfer phenomena are superimposed upon the diffusion process. This is the case in the study of heat transfer in moving liquids and in the study of the atmospheric diffusion of particles in the presence of winds. Equation 1 may then be modified according to the following equation:

$$\nabla^2 \phi - u \frac{\partial \phi}{\partial x} - \frac{v \partial \phi}{\partial y} - \frac{w \partial \phi}{\partial z} = K \partial \phi / \partial t \quad (3)$$

in which u, v, and w represent the transport velocity in the x, y, and z directions, respectively. If sources of energy or excitation are distributed within the field in a continuous manner, as is the case in the study of heat transfer in a nuclear reactor, Equation 1 is modified as follows:

$$\nabla^2 \phi = K \partial \phi / \partial t + m \quad (4)$$

where m may be a function of the space variables, of time, and of the field potential.

A second class of partial differential equations which recur frequently in engineering work is exemplified by the wave equation $$\nabla^2 \phi = K \frac{\partial^2 \phi}{\partial t^2} \quad (5)$$

in which case the parameter K is associated with the velocity with which a disturbance is propagated throughout the field. In a vibrating string problem, for example, K is equal to the mass per unit length divided by the tension in the string. In the presence of dissipation, as well as energy storage, Equation 5 becomes $$\nabla^2 \phi = K_1 \frac{\partial^2 \phi}{\partial t^2} + K_2 \frac{\partial \phi}{\partial t} + K_3 \phi \quad (6)$$

where $K_1$, $K_2$ and $K_3$ are field parameters and may be functions of position and time. If steady-state conditions have been established in a field governed by Equation 5, the field potential undergoes simple harmonic variations and Equation 5 becomes $$\nabla^2 \phi + K w^2 \phi = 0 \quad (7)$$

where $w$ is the frequency of oscillation.

The third class of partial differential equations relates to the area of structural analysis, wherein the basic equation governing the deflection of elastic members is known as the biharmonic equation. The biharmonic equation is as follows:

$$\nabla^4 \phi = K \partial^2 \phi / \partial t^2 \quad (8)$$

where $\nabla^4$ is termed the biharmonic operator. If the structural member is loaded in a continuous manner, either by external forces or by its own weight, Equation 8 becomes $$\nabla^4 \phi = K_1 \frac{\partial^2 \phi}{\partial t^2} + K_2 \quad (9)$$

where the field parameters $K_1$ and $K_2$ may be functions of position. If steady-state conditions exist $$\nabla^4 \phi + K w^2 \phi = 0 \quad (10)$$

All of the above equations may be formulated in whichever coordinate system appears most suitable to the field geometry, the cartesian, cylindrical, and spherical coordinate systems being the most widely used. Depending upon whether the potential distribution is symmetric about one or more planes, lines or points, the field problem is formulated in one, two or three space variables. The computer or field simulator of this invention is capable of handling field problems governed by Equations 1 through 10 in any suitable coordinate system and in as many as three space variables. In order, however, to simplify the explanation of the system operation, the following discussion emphasizes the simulation of problems formulated in one cartesian dimension "$x$," with the computer components utilized to solve such a problem being illustrated in FIGURE 1. The extension of the method of two and three dimensional fields and fields in other coordinate systems is indicated briefly subsequently.

Problems of the type described above are also known as "initial value problems." Typically, in problems governed by Equations 1, 2 and 3, the potential along the field boundary, or the potential gradient at the field boundary, for all time $t>0$ is given, the potential everywhere within the field at time $t=0$ is specified. As indicated above, the word potential is utilized herein in a generic sense indicating a particular variable depending upon the particular physical area being considered. For example, in heat transfer problems, the word potential means the temperature; in particle diffusion problems, it means concentration; in elasticity problems, it means strain; etc. In addition to the potential specification at $t=0$, transient excitations may be present within the field or at the field boundaries. The problem is to determine the potential within the field for a time $t$ greater than 0 ($t>0$). Solutions may be required only at a limited number of points within the field or plots of potential ($\phi$) vs. time ($t$) may be required for as many closely spaced points within the field as possible.

In problems governed by Equations 5, 6, 7 and 8, two initial conditions must be supplied for $t=0$. These are usually the potential everywhere within the field and the rate of change of the potential everywhere within the field. The biharmonic Equations 8, 9 and 10 require more boundary conditions than do Equations 1 through 7. In the biharmonic equation, generally two conditions involving $\phi$ or one of its space derivatives are specified at each field boundary. In these equations, the problem is generally to determine the transient variation of $\phi$ at various points within the field as a result of the specified initial conditions and, possibly, external excitations.

For steady-state field problems governed by Equations 7 and 10, generally no initial conditions are specified and the problem is to determine those values of $w$, the eigenvalues, for which a solution to the problem exists. These are the normal modes or characteristic frequencies and represent those frequencies for which free vibrations are possible.

These then are the typical problems which the computer of this invention is particularly suited to solve. Each of the Equations 1 through 10, inclusive, is a time dependent partial differential equation with initial values or conditions being specified. The operation of the computer is hereinafter described in detail with regard to particular illustrative problems. For example, the computer operation is described for solving a vibrating string problem to which Equation 5 above is applicable. The initial conditions are the position and rate of change of the position of the string at the initial time. The problem is a single space dimension problem because one space dimension $x$ suffices to identify any point on the string. The components depicted functionally in FIGURE 1, the one space dimension functional representation of the computer, are, therefore, utilized to solve this problem.

*Finite Difference Expressions*

As described above, the present description will emphasize the solution of field problems which can be formulated in one space dimension ($x$), with extensions to two and three dimensional field problems to be briefly hereinafter described. The first step in the solution of field problems by the computer of this invention is to define a finite-difference grid for deriving the finite difference expressions for the time dependent partial differential equations. A finite difference expression, as indicated above in the introduction, effectively represents a group of lumped elements which together substantially duplicate the characteristics of the field.

As is hereinafter described, the finite difference expression for the partial differential equation to be solved is utilized to determine the number of node modules, the connections between modules and components in the modules, and the setting of various parameters in the modules. It is necessary, therefore, to derive the finite difference expression for the equation to be solved in order to determine how to set up the computer to solve the field problem represented by the equation. The immediate following description is, therefore, a brief description of the mathematics involved in deriving the finite difference expressions for the partial differential equations. For a more complete description of the mathematics involved in deriving finite-difference expression reference is made to chapter 4 of the book identified above entitled "Analog Simulation."

Figure 3:
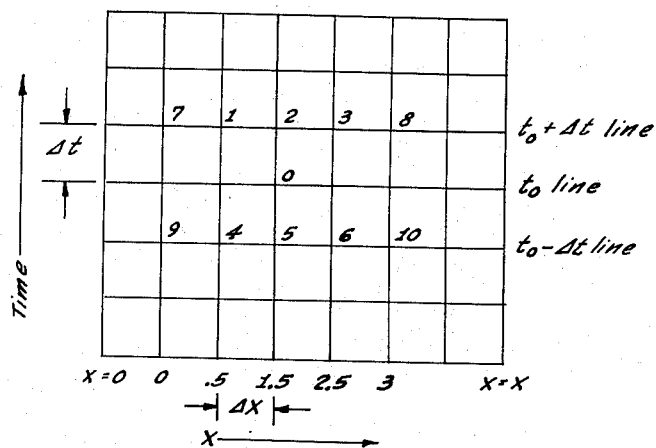
FIGURE 3 is a graphical representation of a field at different times for one space dimension problem, which representation is referred to as a finite difference grid.

The finite difference grid is a visual tool utilized to derive the finite difference expressions. For a one dimensional system, such a finite difference grid will have two coordinates; a space dimension $x$ and a time dimension $t$. Such a finite difference grid is shown in FIGURE 3. Net intervals $\Delta x$ and $\Delta t$ are selected in such a manner that the truncation error resulting from the finite difference operation falls within a specified tolerance. Errors are inherent in a finite difference operation because it is a discretizing operation. The actual potential at a particular point in a field may then differ somewhat from the potential determined utilizing a finite difference expression. Though not completely true, the accuracy of a finite difference solution is increased by decreasing the net intervals because if the intervals are reduced to zero, the discretized equivalent is identical to the continuous field. A method of calculating the error due to the finite difference operation is described in the above-identified book on "Analog Simulation" at pages 103 through 107.

In general, the $x$ coordinate will be bounded at $x=0$ and $x=X$, while the $t$ variable will start at 0 and proceed to infinity. Every point in the finite-difference grid refers to the field potential at some specific $x$ and at some specific instant of time.

In the vibrating string problem, for example, the $x$ coordinate is along the string. The vibrating string problem is depicted in FIGURE 8 and is further hereinafter described. Net intervals $\Delta x$ would then be between pairs of points on the string. Illustratively, for a three foot string, the displacements may be 0.1 foot so that the displacements of 30 different points along the string would be determined at each of a number of time epochs after an initial condition of the string. The time intervals may illustratively be 0.1 second.

To derive the finite difference expression, a typical point within the finite-difference grid is first selected arbitrarily and denoted by the subscript 0. The field potentials occurring at this point and neighboring points at a time $\Delta t$ later than $t_0$ are denoted by subscripts 1, 2, 3, 7 and 8; while the field potentials at the point in question and at neighboring points which occurred at a time $\Delta t$ earlier than $t_0$ are denoted by 4, 5, 6, 9 and 10. These designations are depicted on the finite difference grid illustrated in FIGURE 3. To obtain the finite-difference expression for any one of the partial derivatives of Equations 1 through 10, the partial derivative, is expressed in terms of the potentials at points 0 through 10. Not all these points are required for all equations. For example, the diffusion equation, Equation 1, requires only points 0 through 3; the wave equation, Equation 5, requires points 0 through 6; and the biharmonic equation, Equation 9, requires all the points indicated. The method of solution of each of these equations will now be considered in turn to derive the finite difference expressions which are utilized to set up the computer.

*Diffusion equation.*—In problems governed by the diffusion equation, one initial condition is required for each point in the field. Typically, then, we are given the field potentials at a time $t_0$ and are asked to determine the potentials at time $t_0+\Delta t$. Referring to the coordinate grid shown in FIGURE 3, the two partial derivatives in Equation 1 may be approximated by $$\nabla^2 \phi = \frac{\partial^2 \phi}{\partial x^2} \cong \frac{(d\phi/dx)_{1-2} - (d\phi/dx)_{2-3}}{dx}$$

$$\cong \frac{1}{\Delta x}\left(\frac{\phi_1-\phi_2}{\Delta x} - \frac{\phi_2-\phi_3}{\Delta x}\right)$$

$$\cong \frac{1}{\Delta x^2}(\phi_1 + \phi_3 - 2\phi_2)$$

$$\cong \frac{1}{\Delta x^2}[(\phi_1-\phi_0)+(\phi_3-\phi_0)-2(\phi_2-\phi_0)];$$

(12)

and by $$\frac{\partial \phi}{\partial t} \cong \frac{\phi_2-\phi_0}{\Delta t}$$

where the subscripts indicate the positions in the finite difference grid, with two subscripts such as 1—2 indicating a point half way between 1 and 2.

The finite-difference approximation for the one dimensional diffusion equation becomes by substituting the above approximations for the two terms in the diffusion equation as follows:

$$\frac{\partial^2 \phi}{\partial t^2} - K\frac{\partial \phi}{\partial t} \cong \frac{\phi_1-\phi_0}{\Delta x^2} - 2\frac{\phi_2-\phi_0}{\Delta x^2} + \frac{\phi_3-\phi_0}{\Delta x^2} - \frac{K}{\Delta t}(\phi_2-\phi_0) = 0$$

$$\cong \frac{\phi_1-\phi_0}{\Delta x^2} - \left[\frac{2}{\Delta x^2}+\frac{K}{\Delta t}\right](\phi_2-\phi_0) + \frac{\phi_3-\phi_0}{\Delta x^2} = 0$$

(13)

In this equation, the potential $\phi_0$, corresponding to the field potential at time $t_0$, is known, while the potentials $\phi_1$, $\phi_2$, and $\phi_3$ are to be determined. Equation 13 is, therefore, an implicit equation and is stable for all values of $\Delta t$.

*Wave equation.*—In problems governed by Equations 5 and 6, the potential and the first derivative of the potential are specified as initial conditions for the problem. These two values determine in effect approximately the value of the potential everywhere within the field at a time $\Delta t$ and after the initial instant. With reference to the finite difference grid shown in FIGURE 3, the potentials at line $(t_0-\Delta t)$ and at line $t_0$ are known, and the potentials in line $(t_0+\Delta t)$ are to be determined. To obtain an unconditionally stable implicit approximation of Equation 5, the second space derivative at grid point 0 is approximated by taking second derivative at point 2 and point 5 and by averaging these two values.

$$\left.\frac{\partial^2 \phi}{\partial x^2}\right|_2 \cong \frac{\phi_1-\phi_2}{\Delta x^2}+\frac{\phi_3-\phi_2}{\Delta x^2}=\frac{\phi_1-\phi_0}{\Delta x^2}-2\frac{\phi_2-\phi_0}{\Delta x^2}+\frac{\phi_3-\phi_0}{\Delta x^2}$$

$$\left.\frac{\partial^2 \phi}{\partial x^2}\right|_5 \cong \frac{\phi_4-\phi_5}{\Delta x^2}+\frac{\phi_6-\phi_5}{\Delta x^2}=\frac{\phi_4-\phi_0}{\Delta x^2}-2\frac{\phi_5-\phi_0}{\Delta x^2}+\frac{\phi_6-\phi_0}{\Delta 2^2}$$

$$\left.\frac{\partial^2 \phi}{\partial x^2}\right|_0 \cong 1/2\left[\left.\frac{\partial^2 \phi}{\partial x^2}\right|_2+\left.\frac{\partial^2 \phi}{\partial x^2}\right|_5\right]$$

$$\cong \frac{\phi_1-\phi_0}{2\Delta x^2}-\frac{\phi_2-\phi_0}{\Delta x^2}+\frac{\phi_3-\phi_0}{2\Delta x^2}+\frac{\phi_4-\phi_0}{2\Delta x^2}-\frac{\phi_5-\phi_0}{\Delta x^2}+\frac{\phi_6-\phi_0}{2\Delta x^2}$$

(14)

The time derivative is approximated as $$\left.\frac{\partial^2 \phi}{\partial t^2}\right|_0 \cong \frac{\phi_2-\phi_0}{\Delta t^2}+\frac{\phi_5-\phi_0}{\Delta t^2}$$

(15)

The overall approximation for the wave equation then becomes $$\frac{\partial^2 \phi}{\partial x^2}-K\frac{\partial^2 \phi}{\partial t^2}=\frac{\phi_1-\phi_0}{2\Delta x^2}-\frac{\phi_2-\phi_0}{\Delta x^2}+\frac{\phi_3-\phi_0}{2\Delta x^2}+\frac{\phi_4-\phi_0}{\Delta x^2}$$
$$-\frac{\phi_5-\phi_0}{\Delta x^2}+\frac{\phi_6-\phi_0}{2\Delta x^2}-K\frac{(\phi_2-\phi_0)}{\Delta t^2}-K\frac{(\phi_5-\phi_0)}{\Delta t^2}=0$$

(16)

or $$\frac{\partial^2 \phi}{\partial x^2}-K\frac{\partial^2 \phi}{\partial t^2}-\frac{\phi_1-\phi_0}{\Delta x^2}-\left(\frac{2}{\Delta x^2}+\frac{2K}{\Delta t^2}\right)(\phi_2-\phi_0)+\frac{\phi_3-\phi_0}{\Delta x^2}$$
$$+\frac{\phi_4-\phi_0}{\Delta x^2}-\left(\frac{2}{\Delta x^2}+\frac{2K}{\Delta t^2}\right)(\phi_5-\phi_0)+\frac{\phi_6-\phi_0}{\Delta x^2}=0$$

(17)

*Biharmonic equation.*—The treatment of the biharmonic equation, Equation 8, is quite similar to the treatment of the wave equation described above. In this case, it is the fourth derivative of $\phi$ with respect to $x$ which is approximated at lines $(t_0+\Delta t)$ and $(t_0-\Delta t)$, and averaged to provide the fourth space derivative at node 0. The second time derivative is obtained exactly as before, therefore $$\left.\frac{\partial^4 \phi}{\partial x^4}\right|_2 = \frac{1}{\Delta x^4}[\phi_7-4\phi_1+6\phi_2-4\phi_3+\phi_8]$$

$$\left.\frac{\partial^4 \phi}{\partial x^4}\right|_5 = \frac{1}{\Delta x^4}[\phi_9-4\phi_4+6\phi_5-4\phi_6+\phi_{10}]$$

$$\left.\frac{\partial^4 \phi}{\partial x^4}\right|_0 = \frac{1}{2\Delta x^4}[-4(\phi_1-\phi_0)+6(\phi_2-\phi_0)-4(\phi_3-\phi_0)$$
$$-4(\phi_4-\phi_0)+6(\phi_5-\phi_0)-4(\phi_6-\phi_0)+(\phi_7-\phi_0)$$
$$+(\phi_8-\phi_0)+(\phi_9-\phi_0)+(\phi_{10}-\phi_0)]$$

$$\left.\frac{\partial^2 \phi}{\partial t^2}\right|_0 = \frac{\phi_2-\phi_0}{\Delta t^2}+\frac{\phi_5-\phi_0}{\Delta t^2}$$

(18)

so that the finite difference approximation of Equation 8 becomes $$\frac{\partial^4 \phi}{\partial x^4}-K\frac{\partial^2 \phi}{\partial t^2}=-\frac{2}{\Delta x^4}(\phi_1-\phi_0)+\left[\frac{3}{\Delta x^4}-\frac{K}{\Delta t^2}\right](\phi_2-\phi_0)$$
$$-\frac{2}{\Delta x^4}(\phi_3-\phi_0)-\frac{2}{\Delta x^4}(\phi_4-\phi_0)+\left[\frac{3}{\Delta x^4}-\frac{K}{\Delta t^2}\right](\phi_5-\phi_0)$$
$$-\frac{2}{\Delta x^4}(\phi_6-\phi_0)-\frac{1}{2\Delta x^4}(\phi_7-\phi_0)+\frac{1}{2\Delta x^4}+\frac{1}{2\Delta x^4}(\phi_8-\phi_0)$$
$$+\frac{1}{2\Delta x^4}(\phi_9-\phi_0)+\frac{1}{2\Delta x^4}(\phi_{10}-\phi_0)=0$$

(19)

This is again an implicit formulation which is unconditionally stable for all values of $\Delta t$.

A summary of the finite difference expressions for various terms utilized in partial differential equations is given in the above-identified text by W. Karplus on pages 115 and 116.

Setting Up the Computer

As described above, the first step in solving any of the transient field problems is to convert the particular partial differential equation to a finite difference approximation, and the finite difference expression is utilized to set up the computer. The computer actually forms a circuit analog of the finite difference expression with each of the dependent variables in the expression being represented by an electrical voltage. The finite difference expression becomes, therefore, a Kirchoff current law equation. The modules of the computer are set up in accordance with the current law equation in the form of the finite difference equation to duplicate electrically the characteristics of the field.

The next step after the derivation of the finite difference expression for the particular partial differential equation is therefore to substitute therein the parameters of the particular problem to be solved and to set up the computer modules in accordance therewith. This step and the details of the general purpose module depicted in FIGURES 4a and 4b will be hereinafter described in conjunction with a specific simple illustrative problem which was briefly identified above; the vibrating string problem.

Consider, for example, the vibrating string problem which is illustrated in FIGURE 8. An elastic string 200 having a constant mass along its length for any given tension is supported between two supports 201 and 202. The support 201 is movable in a vertical direction but the support 202 is stationary. The support 201 is at a distance of three feet from the support 202 and at that distance the tension in the string is such that the ratio of the mass of the string 200 for each foot divided by the tension is equal to 0.25 sec.$^2$ per ft.$^2$. In the wave equation, Equation Number 5 which was briefly described above, the constant $k$ is equal to $m/T$ the unit mass divided by the tension. The constant $k$ therefore equals 0.25.

At a time arbitrarily noted by $t=0$, the support 201 is suddenly displaced upward a distance of 10 units which may, for example, be 0.1 inch. As a result, the three foot elastic string 200 begins to vibrate. The field problem, which is to be solved, is to describe the motion of the string 200 thereafter. In other words, what is the displacement of all points on the string 200 for times $t$ greater than zero. The problem is a single space dimension problem because the displacement of the various points on the string 200 is only either up or down in a vertical direction which is in a direction perpendicular to the $x$ axis. The string 200 is supported by the support 201 at $x=0$ and by the support 202 at $x=3$.

Assuming that there is a negligible viscous damping, the deflection of the string 200 is then characterized by the wave equation, Equation Number 5, with $k$ equal to ¼ or 0.25

$$\frac{\partial^2 \phi}{\partial x^2} = 1/4 \frac{\partial^2 \phi}{\partial t^2}$$

Where $\phi$ is equal to the displacement of any point on the string 200, $x$ is the location of any point on the string from the horizontal support 201 and $t$ is the time. For this particular vibrating string problem, the boundary and initial conditions are as follows:

(1)            $\phi(0,x)=0$ (2)            $\frac{\partial \phi}{\partial t}(0, x)=0;$ (3)            $\phi(t,0)=10$ and (4)            $\phi(t,3)=0$ These four conditions indicate respectively that at a time $t=0$ the displacement of any point along the string 200 is 0; that the change of the displacement with respect to time of any point at a time $t=0$ is also 0; that the displacement of the point $x=0$ at any time $t$ thereafter is 10 units; and that the displacement of the point on the string 200 at $x=3$ remains 0 at any time $t$.

Utilizing the calculations of finite differences which was briefly described above, the wave equation is replaced by the finite expression equation number 17. The finite difference equation number 17 is as follows:

$$\frac{\partial^2 \phi}{\partial x^2} - K\frac{\partial^2 \phi}{\partial t^2} = \frac{\phi_1 - \phi_0}{\Delta x^2} - \left(\frac{2}{\Delta x^2} + \frac{2K}{\Delta t^2}\right)(\phi_2 - \phi_0) + \frac{\phi_3 - \phi_0}{\Delta x^2}$$
$$+ \frac{\phi_4 - \phi_0}{\Delta x^2} - \left(\frac{2}{\Delta x^2} + \frac{2K}{\Delta t^2}\right)(\phi_5 - \phi_0) + \frac{\phi_6 - \phi_0}{\Delta x^2} = 0$$

(17)

Equation 17 is assumed to be a Kirchoff current law equation of an electrical circuit which is the substantial analog of the vibrating string. The finite difference expression for the wave equation has six terms, four of which are positive and two of which are negative. For the circuit analog of the expression, each of the terms represents the current through a circuit element to a central point or node. With six terms, the circuit analog has six circuit elements four of which are positive and two of which are negative in accordance with the polarity of the terms in the expression. FIGURE 6 is a simplified representation of a typical node circuit or module which is an analog of the wave equation finite difference expression. The positive resistors $R_1$, $R_3$, $R_4$ and $R_6$ are all equal to $\Delta x^2$ which is the inverse of the coefficient of each of the four positive terms of the finite difference expression. The negative resistor elements $R_2$ and $R_5$ are both equal to $$-\frac{\Delta t^2 \Delta x^2}{2K\Delta x^2 + 2\Delta t^2}$$

which is the inverse of the coefficients of the two negative terms of the expression. To achieve convenient resistor values, all the above expressions may be multiplied by a suitable scale factor.

The junction points 0 through 6 in FIGURE 6 have the same designations as the corresponding points on the finite difference grid in FIGURE 3. The points 1, 2 and 3 in FIGURE 6 and in the finite difference grid of FIGURE 3 represent the characteristics of three different positions X on the string 200 at a time $t_0 + \Delta t_0$. The point 0 represents the characteristic of a position $x$ on the string 200 which position is the same as that for point 2 but at a time $t_0$ which is before the time $t_0 + \Delta t$. The points 4, 5 and 6 represent characteristics of positions $x$ on the string corresponding to the positions of points 1, 2 and 3 but at a time $t_0 - t$.

The first term of Equation 17

$$\frac{\phi_1 - \phi_0}{\Delta x^2}$$

identifies the location of the resistor in the module to be between points 1 and 0 of the grid and the magnitude and polarity of the resistor is $+\Delta x^2$. Each of the other five terms similarly locates and determines the magnitude and polarity of another resistive component in the node. The typical node for the wave equation in its most simplified form includes, therefore, only the six resistors R1 through R6, each expressed in terms of $\Delta x$ and $\Delta t$, the space and time increments. If the increments $\Delta x$ and $\Delta t$ are, therefore, set or determined, the values of the positive and negative resistors for the typical node for the wave equation as utilized in the simulator may be readily determined. The detail circuit arrangement of suitable negative resistors are hereinafter described.

In the particular sample problem being described, $\Delta t$ represents intervals of time following the displacement of the end of the string 200 in FIGURE 8 by the support 201, and $\Delta x$ represents small distances along the string 200 between the supports 201 and 202. For this problem, practical magnitudes of $\Delta x$ and $\Delta t$ might be respectively 0.3 feet and 0.1 second. In other words, the displacement at positions on the string 200 which are spaced by 0.3 feet would be determined at intervals of 0.1 second by the computer. For increments of 0.3 feet, ten node modules would be serially connected. The net spacings $\Delta x$ and $\Delta t$ are selected so that errors resulting from the approximation do not exceed a specific tolerance. As briefly indicated above, errors occur due to the approximations inherent in discretizing the field. Displacement errors at the node points between node modules may differ from those actually existing at corresponding locations within the field.

The errors resulting from assuming respective values of 0.3 feet and 0.1 second for $\Delta x$ and $\Delta t$ are quite small and are, therefore, practical. However, to simplify the explanation of the computer which operates in exactly the same manner for any spacings and intervals, the convenient values of $\Delta x$ equal to 1 foot and $\Delta t$ equal to 1 second are assumed. In this manner, the displacements of the points at $x$ equal to 0.5, 1.5 and 2.5 feet at 1 second intervals are to be determined. For these values of $\Delta x$ and $\Delta t$ the magnitudes of the resistors $R_1$ through $R_6$ in the typical wave equation node illustrated in FIGURE 6 may readily be calculated.

$$R_1 = R_3 = R_4 = R_6 = x^2 = 1, \text{ and } R_2 = R_5 = \frac{-\Delta t^2 \Delta x^2}{2Kx^2 + 2\Delta t^2} = -0.4$$

To obtain conventional resistor values, these magnitudes (1 and 0.4) may be multiplied by a common factor, for example, $10^5$. The network resistors $R_1$, $R_3$, $R_4$, $R_6$ then become equal to 100 kilo-ohms while $R_2$ and $R_5$ become equal to $-40$ kilo-ohms. A resistance of 100 kilo-ohms is utilized for the network resistors when they represent connections between adjacent nodes spaced at 1 foot intervals. As is hereinafter described, however, some of the positive resistors for the node modules are 25 kilo-ohm resistors representing the 0.5 foot interval between the node modules and the boundaries because two of the positions are located at respective distances of 0.5 feet each from the ends of the string 200.

In view of the choice of $\Delta x$ at 1 foot intervals along the string 200, three node modules are required because the string 200 is three feet long. The three node modules are serially connected in the manner illustrated both in FIGURE 1 and in FIGURE 9. FIGURE 9 is actually a simplified representation of the computer showing only the various components utilized to solve this particular vibrating string problem. Only three node modules M1, M2 and M3 are depicted representing the points at $x=0.5$, 1.5 and 2.5 on the vibrating string 200. The three node modules M1, M2 and M3 are serially connected between the two sets of boundary condition potentiometers P1 and P2 which may be set to represent the conditions at $x=0$ and at $x=3$, respectively.

The boundary condition potentiometers P1 and P2 include respectively the three potentiometers 112, 113, and 114 and the three potentiometers 115, 116 and 117. Each of the potentiometers 112 through 117, inclusive, is connected between a plus 50 volt positive potential source and a minus 50 volt potential source. The potential on the adjustable tap of the potentiometers 112 through 117 is, therefore, between plus and minus 50 volts. As described above in reference to FIGURE 8, the end of the string 200 at $x=0$ is moved up by a distance of 10 units (0.1 inch). The potentiometers 112, 113 and 114 are accordingly set to provide potentials indicating this boundary condition. A potential of plus 10 volts, for example, may be utilized to indicate an upward displacement of 10 units. The potentiometers 115, 116 and 117 are set to provide potentials of zero volts to indicate there is no displacement of the right end of the string 200 at the support 202.

The setting of the three potentiometers 112, 113 and 114 represent conditions at three successive time epochs ($t_0 + \Delta t$, $t_0$ and $t_0 - \Delta t$) spaced at intervals of $\Delta t$ which are each 1.0 second in the above illustration. Setting all three potentiometers 112, 113 and 114 to provide plus 10 volts, indicates that at any three successive intervals after $t=0$, the left end of the string 200 in FIGURE 8 at $x=0$, remains at its 0.1 of an inch upward displaced position. Similarly, the setting of the three boundary potentiometers 115, 116 and 117 to provide 0 volts indicates that at any three successive epochs, the right end of the string 200 at $x=3$ remains stationary at its undisplaced position.

Just as the two sets of potentiometers indicate boundary conditions at three successive time increments, each of the modules M1, M2 and M3 (FIGURE 9) indicates the conditions of a point on the string 200 at three successive time increments. The module M1 simulates the conditions at $x=0.5$, the module M2 simulates the conditions at $x=1.5$ and the module M3 simulates the conditions at $x=2.5$. Each of the modules M1, M2 and M3 includes three nodes or junction points referred to as nodes N-0, N-2 and N-5. The electrical condition at the node N-0 represents the displacement of a point on the string 200 at a particular instant or time $t_0$, the electrical condition at node N-2 represents the displacement of the same point on the string 200 at time $\Delta t$ after the time $t_0$, and the electrical condition at node N-5 represents the displacement of the same point on the string 200 at a time $\Delta t$ before the time $t_0$. The three subscripts 0, 2 and 5 are selected to associate the three nodes N-0, N-2 and N-5 with the three points 0, 2 and 5 on the finite difference grid in FIGURE 3.

A simplified description of each of the node modules M1, M2 and M3 is then that each includes three nodes N-0, N-2 and N-5 with connections therebetween and between them and nodes of adjacent modules or boundary condition potentiometers. In FIGURE 6, which is a simplified representation of the main components in the wave equation node module, the points 1 through 6 correspond to the points on the finite difference grid. In the node module M1, node N-0 corresponds to point 0 in FIGURE 6, node N-2 to point 2 and node N-5 to point 5. When the node module M1 is, therefore, set up for the wave equation, the nodes N-2 and N-5 are connected to the node N-0 by negative resistance components corresponding to $R_2$ and $R_5$ in FIGURE 6.

As indicated by the circuit representation in FIGURE 6, the nodes N-0 in each of the modules M1, M2 and M3 in addition to being connected to the nodes N-2 and N-5 are also connected to junctions corresponding to points 3 through 6 in FIGURE 6. With respect to any particular position on the string 200, the points 3 and 6 are at positions to its right along the string 200 and the points 1 and 4 are at positions to its left along the string 200. Each of the node modules M1, M2 and M3, however, represents only conditions at a particular point on the string 200 so that the points 1, 4, 3, and 6 with respect to any position on the string are not in the same module but are in adjacent modules or boundary condition potentiometers.

For example, the node N-0 of the module M1 representing the displacement of a point on the string at $x=0.5$ is connected to the module M2 at the right representing the displacement at a point $x=1.5$ and also to the boundary condition potentiometers at the left representing the displacement at $x=0$. The module M2 also has three nodes N-0, N-2 and N-5. With respect to the module M1 at $x=0.5$, the node N-2 of the module M2 represents the point 3 in FIGURE 6 and on the finite difference grid in FIGURE 3 because it represents a point which is one space increment $\Delta x$ to the right and one time increment $\Delta t$ later than the node N-0 of the module M1. Each of the nodes N-0 of the modules M2 and M3 are similarly interconnected with the nodes in adjacent modules and with the boundary condition potentiometers to form an array of the type depicted in FIGURE 12. FIGURE 12 represents the computer set up for the wave equation to solve the particular vibrating string problem being described. The configuration of each module would be the same to solve any problem by the wave equation but a different number of modules are utilized.

FIGURE 12 functionally illustrates only the main components utilized in the computer to solve the vibrating string problem. FIGURE 9 illustrates the computer components utilized to solve the wave equation in further detail including an indication of which connections are permanently wired in the computer and which are flexible. FIGURES 4a and 4b illustrate as an example one design of the general purpose node module, and also the flexible connections utilized in the general purpose module when it is set up illustratively for the node module M1 in the vibrating string problem.

As illustrated in FIGURE 9, the connections from the center taps of the boundary condition potentiometers 112 through 117 to the node modules, and a number of other connections as well are dash lines. The dash lines represent patch cord connections or connections which are not permanently wired in the computer. These connections are established for the particular problem being solved. In FIGURES 4a and 4b, which illustrate the general purpose module, the particular connections in the module M1 are also illustrated by dash lines.

In FIGURES 4a, 4b and 9, in addition to the flexible connections, a number of resistors are also shown as dash lines or in phantom. These resistors may be plug in precision resistors or they may represent adjustable resistors which are not set at open circuit conditions but are set to provide particular resistances. The resistors 29R, 30R, 31R and 32R, for example, are resistors of this type.

Before proceeding with a description of the flexible connections and the plug in or adjustable connections utilized to set up the computer for solving the vibrating string problem, the permanent wiring is first briefly described.

As described above, in reference to FIGURE 6, the simplified node-module for the wave equation includes two negative resistance components. The general purpose module depicted in FIGURES 4a and 4b, therefore, includes negative resistance components because the general purpose module is utilized to solve the wave equation. Actually, the simplified node module for the diffusion equation as illustrated in FIGURE 5 and for the biharmonic equation as illustrated in FIGURE 7 also include negative resistive components. This is due to the fact that the respective finite difference expressions also include negative terms. Generally, therefore, when the computer is set up, negative resistance components are included as part of the simulator arrangement regardless of which one of these three types of equations is being solved.

The negative resistance component utilized in the module is shown particularly in FIGURE 11. The circuit elements in FIGURE 11 are given the same reference designations as the corresponding components in FIGURES 4a and 4b. Moreover, the corresponding circuit elements in FIGURES 9, 10, 13 and 14, which are simplified versions of the general purpose module for the particular equations, also have been given the same reference designations.

Referring to FIGURE 11, the negative resistance device includes a direct-current amplifier 2A of the type utilized in conventional analog computer installations. The amplifier 2A is one of three amplifiers 1A, 2A and 3A which are part of each of the node modules. An amplifier of the type utilized in analog computer installations is shown, for example, on page 232 of the above-identified book entitled "Analog Simulation." The amplifier 2A is characterized by a flat frequency response down to direct-current, an open loop gain in excess of 10,000 and a negative output for a positive input. The amplifier 2A is utilized to force current into the node N–0 of the module. As described above, each module includes three nodes N–0, N–2 and N–5 which correspond to the three points 0, 2 and 5 in the finite difference grid (FIGURE 3). Node N–0 represents conditions at time $t=t_0$, node N–5 at time $t_0-\Delta t$ and node N–2 at time $t=t_0+\Delta t$.

If node N–0 has a more positive (or less negative) voltage than an adjacent node to which it is connected by a resistor, and if current flows through the resistor from node N–0 into the adjacent node, the resistive element is considered to have a positive magnitude; if node N–0 has a more negative (or less positive) voltage than an adjacent node to which it is connected by a resistive element, and if current flows through this resistor from node N–0 into the adjacent node, the resistive element is considered to have a negative magnitude. Amplifier 2A together with resistors 42, 103 through 108, and 110 produces a condition identical to the one which would exist if node N–0 were actually connected to one, two, or as many as four adjacent nodes through negative resistors. That is the current which flows into or out of node N–0 (depending upon the polarity of node N–0 and the adjacent nodes) is the same which would flow if these nodes were actually connected by separate negative resistive elements.

Amplifier 2A is shunted by a feedback resistor 110, which may be a three megohm resistor, and its output is connected to node N–0 through a variable resistor 42, which may be a ten-turn 100K ohm potentiometer. Resistors 103 through 108 are connected to the input terminal of amplifier 2A. Of these, resistors 103, 104, 105, and 106 may be three megohm resistors, resistor 107 may be a 1½ megohm resistor, and resistor 108 may be a one megohm resistor. The free ends of resistors 103 to 108 are connected to plug-in terminals 85 to 90 from which plug-in connections to adjacent nodes or the output of inverter amplifier 3A may be made.

If the diffusion equation is being simulated, one negative resistor is required to connect node N–0 with node N–2. To achieve this, terminal 85 is connected to node N–2, and terminal 89 is connected to the output of the inverter amplifier 3A, whose output voltage will be minus the voltage at node N–0. The voltage at the output of amplifier 2A will then be $$V_{2A} = -R_{110}\left[\frac{V_2}{R_{103}} - \frac{V_0}{R_{107}}\right]$$

where $V_0$ is the voltage at node N–0. $V_{2A}$ is the voltage at the output of amplifier 2A, $V_2$ is the voltage at node N–2, R is resistance and the subscripts identify respective components. The current flowing through resistor 42 into node N–0 is then $$i = \frac{1}{R_{42}}\{V_{2A} - V_0\} = \frac{1}{R_{42}}\left\{-\frac{R_{110}V_2}{R_{103}} + \frac{R_{110}V_0}{R_{107}} - V_0\right\} = \frac{V_0 - V_2}{R_{42}}$$

where $i$ is the current; which is precisely the current which would flow if node N–0 were connected to node N–2 by a negative resistor having the same absolute magnitude as the positive resistor 42.

If the wave equation is being simulated, two negative resistors are required for each node module; one connecting node N–0 with node N–2 and another connecting node N–5 to node N–0. This is accomplished by connecting node N–5 to node N–5, terminal 86 to node N–2, and terminal 90 to the output of the inverter, whose output voltage is the negative of the voltage at node N–0. The output voltage $V_{2A}$ of amplifier 2A is then $$V_{2A} = -R_{110}\left[\frac{V_2}{R_{103}} + \frac{V_5}{R_{104}} - \frac{V_0}{R_{108}}\right]$$

where $V_5$ is the voltage at node 5 and the symbols have the same significance as above. The current flowing through resistor 42 into node 42 is then $$i = \frac{1}{R_{42}}\{V_{2A} - V_0\} = \frac{1}{R_{42}}\left\{-\frac{R_{110}V_2}{R_{103}} - \frac{R_{110}V_5}{R_{104}} + \frac{R_{110}V_0}{R_{108}} - V_0\right\}$$

$$= \frac{V_0 - V_2}{R_{42}} + \frac{V_0 - V_5}{R_{42}}$$

which is exactly the same current which would flow into node N–0 if node N–0 were connected to nodes N–2 and N–5 by two separate negative resistors each having the same absolute magnitude as the positive resistor $R_{42}$.

To simulate the biharmonic equation, node N–0 must be connected to nodes N–1, N–3, N–4, and N–6 all located in adjacent modules through four negative resistors. Accordingly, terminals 85, 86, 87, and 88 are connected to these nodes. Terminals 89 and 90 are both connected to the output of the inverter 3A. The parallel combination of resistors 107 and 108 is 0.6 megohm so that the current into node N–0 is given by $$i = \frac{1}{R_{42}}\{V_{2A} - V_0\} = \frac{1}{R_{42}}\left\{-\frac{R_{110}V_1}{R_{103}} - \frac{R_{110}V_3}{R_{104}} - \frac{R_{110}V_4}{R_{105}} - \frac{R_{110}V_6}{R_{106}} + \frac{R_{110}V_0}{R_{107}} + \frac{R_{110}V_0}{R_{108}} - V_0\right\} = \frac{V_0 - V_1}{R_{42}} + \frac{V_0 - V_3}{R_{42}} + \frac{V_0 - V_4}{R_{42}} + \frac{V_0 - V_6}{R_{42}}$$

exactly as required.

It should be noted that regardless of the number of negative resistance elements required at a node, only one amplifier 2A is required. A significant economy in equipment is effected thereby.

In FIGURES 4a and 4b, with FIGURE 4b at the right of FIGURE 4a, the resistors 103 and 104 are coupled to the amplifier 2A through a switch 18. The switch 18 is a six-position wafer switch having eight sets of contacts S1 through S8, inclusive, which are controlled by a selector dial 18a. Briefly, the first three positions 1 to 3 of the switch 18 are utilized for amplifier balancing operations which are hereinafter described and which are unnecessary if chopper stability and amplifiers are used. The second three positions 4 through 6 are utilized respectively for the diffusion equations, the wave equations and static equations such as the Poisson and Laplace equations. With the switch 18 set at the position 5, the three resistors 103, 104 and 108 are connected through terminal 5 of the set of contacts S4 of the switch 18 through the brush S4–b to the input of the amplifier 2A.

The adjustable potential source, which introduces a positive potential to the resistor 108 includes the inverter 3A depicted in FIGURE 4b. The inverter 3A is the second of the three amplifiers 1A, 2A and 3A utilized in each node module of the computer.

The inverter 3A is shunted by a feedback resistor 111 which may have a value of one megohm. The exact potential at the input of the inverter 3A and, therefore, at the resistor 108 of the negative resistance arrangement is determined by the setting of the potentiometer 22 and also by a connection through the wafer switch 18. The connection to the input of the inverter 3A is through the deck or set of contacts S2 of the switch 18 and a resistor 109 to a potentiometer load resistor 17. The resistor 109 may have a suitable value such as 1 megohm and the potentiometer load 17 which may be a plug-in or an adjustable resistor. The load resistor 17 provides for equal loading of three potentiometers 4P, 5P and 6P which are hereinafter described so that potentiometer loading errors are compensated. The junction between the resistor 109 and the potentiometer load resistor 17 is coupled to terminals 2 of a second wafer switch 7P. Similarly designated terminals of the wafers 7a, 7b and 7c are interconnected and the brushes of the three wafers 7a, 7b and 7c of the switch 7P are coupled respectively to three potentiometers 4P, 5P and 6P. The potentiometers 4P, 5P and 6P may each be a ten turn, 5000 ohm rotary potentiometer manufactured by the Helipot Division of Beckman Instruments of Pasadena, California. The setting of the potentiometers 4P, 5P and 6P, which are coupled between plus and minus 50 volt sources, determines the potential at the brushes of the wafers 7a, 7b and 7c. With the switch 7P set at position 1, the potentiometer 4P determines the potential coupled through the switch 7P and bank S1 of the switch 18 to a meter 8M, and the potentiometer 5P determines the potential to the inverter 3A. At position 2 of the switch, the potentiometer 5P is determinative of the potential coupled to the meter 8M and the potentiometer 6P is determinative of the potential to the inverter 3A. The reason for this particular switching arrangement for controlling the potential to the inverter 3A and, therefore, across the resistor 108 is, as is hereafter described in detail, during the operating sequence description to establish initial conditions at the node module and determine the solution of the problem.

In addition to the amplifiers 2A and 3A, the node module includes the third amplifier 1A which is designated H.G. in FIGURE 4a to indicate it as a high gain amplifier without a feedback resistor. The amplifier 1A acts as an automatic servo for the voltage at the node N–2 causing it to assume the required value without interactive adjustment with other nodes. The output of the amplifier 1A at terminal 96 is connected through a plug connection to terminal 65 of the node N–2. The operation of the computer demands that the feed-in voltage to the nodes at $t_0 + \Delta t$, namely at points 7, 1, 2, 3 and 8 of the grid in FIGURE 3 or nodes N–2 in FIGURE 9, all be adjusted simultaneously until the specified potentials appear at node N–0. This is accomplished utilizing the amplifier 1A without a feedback resistor and with the amplifier 1A providing a positive output for a positive input.

In the treatment of the biharmonic equation, node N–2 may be connected to node N–0 through a positive rather than a negative resistor depending upon the polarity of the terms of the finite difference expression. In that event, stability consideration demands that the high gain amplifier have a negative output for positive input. This may be accomplished by replacing the plug-in amplifier 1A shown in FIGURE 4a by another plug-in amplifier whose positive and negative inputs are interchanged and in case the amplifier contains no internal chopper stabilization, by providing a —300 volt instead of a +300 volt balancing source. This changeover may be effected by an additional switch 123 shown in FIGURE 4a. When the switch 123 is operated, it reverses the polarity of the output of the amplifier 1A for positive input.

The automatic servo operation may be summarized as follows: As shown in FIGURE 13, the arrangement consists of the amplifier 1A together with two input resistors 100 and 102. The amplifier 1A has a positive output for positive input and a feedback resistor is not provided. The feedback capacitor 47, which may be 0.001 microfarad and which is included only to obviate instability, is too small in magnitude to have any other effect upon the operation of the circuit. The free end of resistor 102 is connected to node N–0, and the free end of resistor 100 is connected via terminals 94 and 80 to the output of amplifier 3A. The voltage at that point is the negative of the voltage which is specified for node N–0. The purpose of the servo circuit is to assure that this voltage actually does appear at node N–0. The output of amplifier 1A is connected via terminals 96 and 65 to node N–2, which is in turn connected to node N–0 through a positive or negative resistor, depending upon the equation being solved.

Since amplifier 1A has a very high gain, any voltage appearing at its input terminal will at once produce a large voltage at node N–2. If the resistors 100 and 102 are equal in magnitude (they may both be 5 megohms) the voltage at the amplifier input will be equal to the difference between minus and the output voltage of amplifier 3A (that is the voltage that is supposed to exist at node N–0) and the voltage actually existing at node N–0. The net input signal is therefore an error signal. This signal is amplified, appears at the output of amplifier 1A, and produces a current from node N–2 to node N–0, such that the voltage at node N–0 is altered to minimize this error. The voltage at node N–0 therefore automatically and very rapidly assumes the value specified for it. This is effected simultaneously at all node modules and makes iterative or trial-and-error balancing operations unnecessary.

As described above, the potential at node N–0 in FIGURE 4a is coupled through a resistor 102, which may be 5 megohms, through contact 5 of the set of contacts S6 and brush S6–b of the switch 18 to the input of the high gain amplifier 1A. With switch 18 in positions 4, 5 or 6, the amplifier output at node N–2 automatically assumes a voltage such that a current flows from node N–0 to node N–2 to cause the voltage at node N–0 to assume its specified magnitude.

To briefly recapitulate, the node module depicted in FIGURES 4a and 4b includes three amplifier arrangements: the amplifier 1A acts as the automatic servo to force the voltage at node N–0 to assume the required value; the amplifier 2A simulates the required negative resistance components and can assume the function of 1, 2 or 4 negative resistors as required by the problem; and the amplifier 3A acts as a sign changer. The node module also includes two wafer switches 18 and 7P and the meter 8M. The two switches 18 and 7P respectively set up connections for the problem and introduce initial value potentials for each step in the computation. These two switches 18 and 7P and the meter 8M are hereinafter further described.

As described above, when the general purpose node module is set up to solve a particular problem, its various components are arranged to duplicate the finite difference expression for the equation utilized to solve the problem. In the above illustration for the vibrating string problem depicted in FIGURE 8, the wave equation is utilized and the electrical analog for the finite difference expression of the wave equation is shown in FIGURES 6 and 12. The electrical analog of each module includes four positive resistors $R_1$, $R_3$, $R_4$ and $R_6$ and two negative resistors $R_2$ and $R_5$. In the particular problem being described, the magnitudes of the resistors $R_1$, $R_3$, $R_4$ and $R_6$ are 100 kilo-ohms each and the value of the negative resistors $R_2$ and $R_5$ are each 0.4 kilo-ohm. These values are determined as described above in accordance with the assumptions of $\Delta x$ and $\Delta t$ for the particular problem. The node N–0 is connected to four plug-in type resistors 29R through 32R, to a rheostat 42 and to the resistor 102 which was described above. The resistors 29R through 32R are respectively plugged into plug-in terminals 29 through 32, and the resistor 102 forms part of the amplifier arrangement including the high gain amplifier 1a.

The node module includes a number of resistor plug-in terminals for receiving precision plug-in resistors. Not all of the terminals are utilized for each problem being solved. The node N–0 has associated therewith 5 terminals 29 through 33, the node N–2 has 4 terminals 38 through 41 and the node N–5 four terminals 34 through 37. It is evident that any number of plug-in resistors at each node may be utilized and that rheostats may be utilized instead of plug-in type resistors. The particular arrangement and number of terminals in FIGURES 4a and 4b, which is illustrative, is adequate for solving the transient field problems.

Assuming that the node module depicted in FIGURES 4a and 4b is the node module M1 in FIGURE 9 which is at the position $x=0.5$ on the string 200 (FIGURE 8), boundary condition potentials are provided from the boundary condition potentiometers to terminals 52 and 53. These boundary condition potentials, at 10 volts each, are provided from the three potentiometers 112, 113 and 114 which are set, as described above, to represent the boundary conditions at $x=0$ for the particular problem being solved. A ten volt potential, therefore, is present at terminals 52 and 53. As illustrated in FIGURE 9, the terminals 54 and 55 of the node N–0 of the node module M1 are coupled respectively to terminals 68 and 75 of the next node module M2. The terminal 68 is at the node N–2 in the module M2 and the terminal 75 is at the node N–5 in the module M2.

In this manner, the node N–0 of the module M1 is coupled respectively by the resistors 31R and 32R to the nodes N–2 and N–5 of the module M2. The resistors 31R and 32R correspond to the positive resistors R3 and R6 in FIGURES 6 and 12 and accordingly have a value of 100 kilo-ohms each.

The resistors 29R and 30R are not 100 kilo-ohm resistors because the connection of the node module M1 at position $x=0.5$ is to the boundary potentiometers at $x=0$ so that a spacing of $\Delta x$ of 0.5 feet, therefore, exists therebetween instead of 1 foot. The coefficient of the positive finite difference expressions for the wave equation is $1/\Delta x^2$ so that a value of 0.25 ($.5 \times .5 = .25$) instead of 1 is utilized for the resistors. The magnitude of the resistors 29R and 30R terminating at the boundary condition potentiometers 112 and 114 is, therefore, 25,000 instead of 100,000 ohms.

In addition to the four resistors 29R, 30R, 31R and 32R terminating at the node N–0 of the module M1, two negative resistors R2 and R5 in FIGURE 6 terminate at the node N–0, and the amplifier arrangement including the amplifier 1A also terminates at the node N–0 (FIGURE 4a). The negative resistance components, including the two resistors 103 and 104 and the amplifier 2A terminate at terminal 77. The terminal 77 is connected by a rheostat 42 to the node N–0. Terminal 85 at the resistor 103 is connected to terminal 74 of the node N–5 and terminal 86 at the resistor 104 is connected to the terminal 66 of the node N–2.

The amplifier 2A, which is part of the negative resistance arrangement also including the resistors 103 and 104, in this manner provides current from the nodes N–2 and N–5 into the node N–0. The rheostat 42 is a time adjusting rheostat because it is set to adjust the resistances across the negative resistance component from node N–2 to node N–0 to the 40 kilo-ohm value required value for R2 and R5 in FIGURE 6 as calculated above. The negative resistors R2 and R5 represent resistors between points on the finite difference grid which are at the same point on the string 200 but at different time epochs. The time interval between these epochs is $\Delta t$ and the setting of the rheostat 42 is determined by $\Delta t$. It is for this reason that the rheostat is referred to as a time adjusting rheostat.

In addition to the six resistors depicted in FIGURE 6 which are coupled to the node N–0, the amplifier arrangement briefly described above which includes the amplifier 1A is coupled between the node N–0 and the node N–2. In this manner, the node module M1 is set by the various plug connections to represent an amplifier version of the simplified version of the module depicted in FIGURE 6. To recapitulate with respect to the correspondence; $R_1$ in FIGURE 6 is represented by the resistor 29R in FIGURE 9; $R_4$ in FIGURE 6 is represented by the resistor 30R, $R_2$ in FIGURE 6 is represented by the resistor 104 in combination with the other components in the negative resistor arrangement; $R_5$ is represented by the resistor 103; $R_3$ is represented by the resistor 31R; $R_6$ is represented by the resistor 30R; and $R_2$ and $R_5$ are represented by the resistors 103 and 104, the amplifier 2A and the rheostat 42. Actually, rheostat 43 assumes the value of each of the negative resistors $R_2$ and $R_5$.

In part, the reason that plug or adjustable resistors are utilized instead of permanently wired resistors is to facilitate simulation of non-homogeneous and time-varying parameter types of field problems. Resistors of different values may, in this manner, be inserted. If the properties of the field do not change in time, for example, where the string 200 in FIGURE 8 has a constant mass and elasticity, fixed resistors may be utilized for some of the plug-in resistors.

*Operating Sequence*

In addition to the resistors forming the basic node depicted in FIGURE 6, the node module includes a number of other components which facilitate the utilization of the module as a practical general purpose node module. The node module shown in FIGURES 4a and 4b, for example, also includes the two wafer switches 7P and 18 and the meter 8M which were briefly described above. The operational techniques for simulating fields governed by the wave equation are such that a voltage produced at the node N–2 (time $t_0+\Delta t$) must subsequently be applied at node N–0 (time $t_0$), and then at node N–5 (time $t_0-\Delta t$).

The reason for this operational technique is readily apparent upon further consideration of the finite difference grid depicted in FIGURE 3. The points 5, 0 and 2 represent the characteristic of one point at three successive time epochs. Suppose the characteristic, which is the displacement is the string problem, is computed for point 2 at $t_0+\Delta t$. The next computation is to find the displacement of the point at a time $\Delta t$ later or at $t_0+2\Delta t$. Each module has three nodes N–2, N–0 and N–5 representing three successive time epochs. The unknown displacement to be found is always to be indicated at node N–2 representing the last time epoch indictable by the module. The displacement already computed is now assumed to be displacement at time $t_0$ so that the potential at node N–0 is set in accordance therewith. As the solution of a problem progresses one time step after another, the potentials at node N–2 are therefore switched to node N–0 and then to node N–5. The switching is an effective time displacement and will be further illustrated during the description of the sequence for solving the vibrating string problem.

Briefly, without reference to the vibrating string problem, the feed-in voltage supplies energizing the network nodes N–5 and N–0 are adjusted to the values specified for these potentials. The voltages at the nodes N–2 corresponding to the time $(t_0+\Delta t)$ are then adjusted utilizing the potentiometers 4P until the node potentials for the nodes N–0 assume the magnitudes specified for them. The node voltages at nodes N–2 now represent the solution to one step in the problem, i.e., the field potentials at time $t_0+\Delta t$. For the next time interval, the potentials now existing at time $(t_0+\Delta t)$ and at time $t_0$ become the initial conditions of the problem; that is, the feed-in voltage supplies at time $(t_0-\Delta t)$ are now given values corresponding to the potentials existing during the preceding measuring interval at time $t_0$; similarly, the voltage supplies at time $(t_0+\Delta t)$ are readjusted until the node potentials measured at time $t_0$ assume a value corresponding to the potentials that existed at time $(t_0+\Delta t)$ during the preceding measuring interval. The potentials now existing at the time $(t_0+\Delta t)$ correspond to the field potentials at a time $(t_0+2\Delta t)$. These values are recorded and the procedures repeated again and again until a sufficiently large time period has been traversed.

The feed-in voltage switching is accomplished through the use of the six position, 60 degree continuous rotation, three decked wafer switch 7P in conjunction with the inverter amplifier 3A. The operation of this combination is such that at any time the three feed-in potentiometers 4P, 5P and 6P are connected respectively through the inverter 3A to the node N–0, to node N–2 and to the balancing galvanometer 8M. The reading of the switch position on the dial 7D of the switch 7P indicates which one of the three potentiometers 4P, 5P and 6P is connected to the galvanometer 8M. At position 1 of the dial 7D, the potentiometer 4P is connected to the meter 8M, at position 2 of the dial 7D the potentiometer 5P is connected and at position 3 of the dial 7D, the potentiometer 6P is connected. When one of the potentiometers 4P, 5P and 6P is connected to the meter 8M, the switch 7P connects the other two potentiometers in numerical sequence to the nodes N–0 and N–5. As the wafer switch 7P is rotated, each potentiometer voltage is cyclically and successively stepped from the galvanometer 8M to node N–0, to node N–5, then back to the meter 8M, etc.

The purpose of the galvanometer 8M is twofold: the amplifiers 1A, 2A and 3A are initially balanced utilizing the meter 8M, as described below, and for time varying field simulation a potential produced at node N–2 is balanced against one of the three potentiometer output potentials (at potentiometers 4P, 5P and 6P). A 60 degree rotation of the potentiometer selector switch 7P, therefore, has the effect of introducing a negative of the balance voltage to node N–0 (because of inverter 3A), and one further switch step results in the voltage with original polarity being impressed at node N–5.

Actually, at any given position of the potentiometer selector switch 7P, two of the three potentiometers 4P, 5P and 6P function as feed-in supply sources at the two nodes N–0 and N–5. These two nodes N–5 and N–0 correspond respectively to the conditions at a particular point on the string 200 at a time $t_0-\Delta t$ and at a time $t_0$. At any time given instant of time, the potential for $t_0-\Delta t$ and for $t_0$ are known but the potential at $t_0+\Delta t$ is to be determined. In other words, if the position or displacement of every point on the string 200, is known at two successive time increments ($t_0$ and $t_0-\Delta t$), it can be determined at the next time increment ($t_0+\Delta t$).

The meter 8M which is a relatively sensitive instrument providing for a full scale reading at, for example, 500 micro amps. is utilized to determine the potential at nodes N–2 ($t_0+\Delta t$). Because of the relatively high sensitivity and the low voltage range of the meter 8M utilized to reduce feed-in errors, meter fusing is not utilized. The meter 8M is protected, however, by connecting four voltage scaling resistors 9R, 10R, 11R and 12R in series with the meter through normally open spring loaded push switches 13 through 16. The applicable potentiometer output is thus balanced against the node N–2 voltage first on the rough scale of the meter, illustratively 0 to 100 volts using the button 13, and finally on the more sensitive scale, illustratively 0.1 volt, utilizing the button 16 for full scale calibration. As indicated above, the meter 8M is utilized to balance the amplifiers 1A, 2A and 3A as well as to determine the potential at node N–2.

If amplifiers 1A, 2A, and 3A are provided with internal chopper stabilization, as is common practice in high quality D.C. amplifiers, any internal amplifier drift is eliminated and no external zero balancing is required. In the interest of economy, amplifiers without internal stabilization may be used; external manual balancing adjustments are then necessary. To this end, the node module shown in FIGURES 4a and 4b is provided with suitable balancing means. The balancing sequence would be utilized approximately once a day. The positions 1, 2, and 3 of switch 18 are used to modify the circuit connections in the node module in order to balance the three amplifiers. As described above, switch 18 is a six position, four deck wafer switch with two poles per deck.

In position 1 of switch 18, amplifier 3A is readied for balance. Input resistor 109 is disconnected from the negative input, the meter 8 is connected from the output of amplifier 3A to ground, and resistor 120 is connected from the negative input to ground. Resistor 120, a rheostat, is connected in the circuit to simulate the parallel combination of all input resistors of amplifier 3A. In case of the wave equation it would be set to one megohm. The negative input of amplifier 3A is also connected through resistor 27, which may be one megohm, to the tap of potentiometer 22, which may be 100 kilo-ohms. One end of potentiometer 22 is grounded while the other terminal is connected to a minus 300 volt D.C. power supply through resistor 28, which may be 220 kilo-ohms. To balance amplifier 3A, potentiometer 22 is adjusted until the meter 8, when activated by push buttons 13 to 16 and resistors 9 to 12 as described above, reads zero. The amplifier then has zero output for zero input.

In position 2 of switch 18, amplifier 2A is readied for balance. Input resistors 103 to 108 are disconnected and instead rheostat 121 is connected from the negative input of amplifier 2A to ground. Rheostat 121 is set at a resistance value equal to the parallel combination of all input resistors in use for the specific equation being solved. In the case of the wave equation with one space variable, rheostat 121 is set to the parallel combination of 3 and 3 and one megohm or 600 kilo-ohms. The negative input of amplifier 2A is also connected to resistor 25, which may be 1 megohm and whose other end is connected to the tap of potentiometer 21, which may be 100 kilo-ohms. One end of potentiometer 21 is grounded and the other end is connected through resistor 26, which may be 220 the amplifiers 2A and 3A are disconnected or feed-in voltages are eliminated with the exception of the output or node N–2 and the 5 megohm feedback resistor 19 is connected across the high gain amplifier 1A.

The following table summarizes the function of the wafer switch 18:

CONNECTIONS AT THE 6 SWITCH POSITIONS

| Deck No. | Brush Connected to— | 1 | 2 | 3 | 4 | 5 | 6 |
|---|---|---|---|---|---|---|---|
| S1 | Meter 8 and Node 2 | Output of Inverter 3A. | Output of Summer 2A. | Output of H.G. Amp. 1A. | Terminal 1 of Pot. switch 7. | Terminal 1 of Pot. switch 7. | Node N–0. |
| S2 | Neg. input of Inverter 3A. | Resis. 120 | Resis. 120 | Resis. 120 | R109 and Terminal 2 of Sw. 7. | | |
| S3 | Node N–2 | Ground | Ground | Ground | | | |
| S4 | Neg. input of Summer 2A. | Resis. 121 | Resis. 121 | Resis. 121 | R103–106 Input Resistors to Summer 2A | | |
| S5 | R19 Feedback resistor for High Amp. 1A. | Negative input of Amp. 1A | | | | | Input of 1A. |
| S6 | Pos. Input of Amp. 1A | Resis. 122 | Resis. 122 | Resis. 122 | R100–102 Input Resistor for H.G. 1A | | |
| S7 | Terminal 3 of switch 7 node voltage N5. | | | | Terminal 2 of switch 7. | | |
| S8 | Moving arm of Pot. 6 | Brush of Deck 7C of switch 7P | | | | | Brush of Deck 7C of switch 7P | kilo-ohms, to a minus 300 volt D.C. power supply. To balance amplifier 2a, potentiometer 21 is adjusted until meter 8, when activated by push buttons 13 to 16 and resistors 9 to 12 as described above, reads zero. In position 2 of switch 18, one end of meter 8 is connected to ground. Amplifier 2A when balanced has zero output for zero input.

In position 3 of switch 18, amplifier 1A is readied for balance. Input resistors 100 to 102 are disconnected from the input and rheostat 122 is connected instead from the positive input to ground. This rheostat 122 is given a resistance setting equal to the resistance of the parallel combination of all input resistors of amplifier 1A. In the case of the wave equation, rheostat 122 is set to the parallel combination of two 5 megohm resistors, that is to 2.5 megohms. In position 3 of switch 18 resistor 19, which may be 5 megohms is connected from the positive input to the output of amplifier 3A, and one end of meter 8 is connected to ground. The other end of meter 8 is connected to the output of amplifier 3A. The positive input terminal of amplifier 1A is also connected to resistor 23, which may be 1 megohm and whose other end is connected to the tap of potentiometer 20, which may be 100 kilo-ohms. One end of potentiometer 20 is connected through resistor 124 which may be 220 kilo-ohms to a minus 300 volt supply, and the other end is connected through resistor 24, which may be 220 kilo-ohms, to a plus 300 volt D.C. power supply. To balance amplifier 1A, potentiometer 20 is adjusted until meter 8, when activated by push buttons 13 to 16 and resistors 9 to 12, as described above, reads zero. If the switch 123 is operated, the balancing operation proceeds in the same manner.

In addition to the three positions 1 through 3, the switch 18 also includes, as indicated above, three equation selector positions 4 through 6. For example, the position 5 marked "wave" functions to introduce the three feed-in potentiometers 4P, 5P and 6P in a manner described above through the switch 7P to the meter 8M and to the two nodes N–0 and N–5. This position is applicable for problems defined in terms of the wave, biharmonic and telegraph equations.

The position 4 of the switch 18, which is marked "Diff." is selected for simulation of the diffusion equation. The node module simulates the simplified form depicted in FIGURE 5.

The position 6 marked as "Stat" of the switch 18 adjusts the circuit components in the node module to simulate the typical node mechanization of Poisson's equation and the normal node configuration. LaPlace's equation is also simulated in this position in which the inputs to The functions of the eight decks or sets of terminals S1 through S8 may also be summarized as follows:

Deck S1—Connects meter 8M to pertinent circuit points.
Deck S2—Applies input signal to inverter 3A in positions 4 and 5.
Deck S3—Grounds node N–2 during balance. Grounds other end of meter 8M during balance.
Deck S4—Applies input signal to summer amplifier 1A in positions 4, 5 and 6.
Deck S5—Applies feedback resistor for amplifier 1A in positions 1, 2, 3 and 6. Grounds negative input for amplifier 1A in positions 4 and 5.
Deck S6—Applies positive input to amplifier 1A in positions 4, 5 and 6.
Deck S7—Connect terminals 2 and 3 of switch 7P in position 4.
Deck S8—Connection of brush of potentiometer 6P of deck 7C of switch 7P in all positions except 4.

In addition to the two wafer switches 7P and 18 and the meter 8M in the general purpose module, a number of other components are also provided to facilitate the use of the module as a practical general purpose node module. For example, the amplifiers 2A and 1A are provided respectively with overload indicators 51 and 50. The amplifier 2A is connected by a megohm resistor 49 to the indicator 51, and the amplifier 1A is connected by a 5 megohm resistor 48 to the indicator 50. The indicator 50 and 51 may illustratively be neon bulbs. A capacitor 47, which may have a magnitude of 0.001 microfarads and which is coupled across the amplifier 1A to prevent instability, does not otherwise affect its operation.

The program or operating sequence for the computer to set up and solve a wave equation after the amplifiers are balanced and plug-in resistors and connections established is tabulated below as a partial recapitulation of the above description and to indicate how the solution of the vibrating string problem is obtained:

(1) The equation selector switch 18 in each of the three modules M1, M2 and M3 is set in the wave position 5;
(2) The potentiometer selector switch 7P in each of the three modules M1, M2 and M3 is set at position 1;
(3) The potentiometer 6P in each of the three modules M1, M2 and M3 is adjusted until the voltage existing at each node N–5 is as specified from initial potential function conditions. A voltmeter, not shown, coupled between the node N–5 and ground may be utilized to measure the voltage at the node N–5, or the position of potentiometer 6P as indicated on a calibrated dial may be used to indicate their voltage. For the vibrating string problem at the time $t_0-\Delta t$, every point on the string 200 is at zero displacement so that the potentiometers 6P in the three modules M1, M2 and M3 are set at their center point to provide zero volts;

(4) The potentiometers 5P in the three modules M1, M2 and M3 are then adjusted until the voltages at nodes N-0 are the negative of the second condition determined from initial rate causes. In the vibrating string problem, this voltage would also be zero because the rate of change of displacement of every point on the string is zero except at $x=0$ at the initial time epoch;

(5) With the switches 7P in the modules M1, M2 and M3 in position 1, the nodes N-2 are connected through the associated galvanometer 8M and the bank S1 of the switch 18 to the adjustable tap of the associated feed-in potentiometers 4P. The potentiometers 4P are then adjusted until the galvanometers 8M read zero volts, successively utilizing the buttons 13 through 16. The voltage at each of the nodes N-2 is then recorded. The setting of the potentiometer 4P to balance the potential at the N-2 is actually not necessary to determine the potential at node N-2, time $t_0+\Delta t$. If the connection to the potentiometer 4P is open circuited, for example, the potential at node N-2 is the same as when the potentiometer 4P is balanced. The reason for balancing the potentials at the galvanometer 8M is to set the potentiometer 4P for the next time step. The next time step is initiated by stepping the switch 7P to position 2;

(6) The potentiometer selector switches 7P in the modules M1, M2 and M3 are then rotated to position 2 and the potentiometers 5P are adjusted to provide a zero deflection at the galvanometer 8M. The potentiometers 4P, which were set in the previous time step, are now coupled to the associated nodes N-0 instead of to the galvanometers 8M. The voltages at nodes N-2 are again recorded;

(7) The selector switches 7P are then rotated to position 3 and the potentiometers 6P are utilized to balance the galvanometers 8M. The voltages at the nodes N-2 are then again recorded;

(8) The selector switches 7P are successively stepped in this manner with the associated potentiometers 4P through 6P being successively utilized to balance the galvanometers 8M. A reading of the potential at the nodes N-2 is taken at each step of the switch 7P and these readings form the solution of the problem.

For the vibrating string problem, the potentiometers 5P and 6P of all three modules M1 through M3 are therefore first set at mid scale to provide zero volts corresponding to the specified initial conditions of zero displacement and zero velocity at their respective positions ($x=0.5$, 1.5 and 2.5). All three modules M1 through M3 are operated in the same way. The potentiometer 4P in all three node modules M1 through M3 are utilized to balance the respectively associated meters 8M at the same time. The readings at nodes N-2 represent the units of deflection of points at $x=0.5$, 1.5 and 2.5 at a time 2 seconds after the initial time, 3 seconds, 4 seconds, etc. For example, assume that the readings when the potentiometer 4P is first adjusted are +30 volts at node N-2 of the module M1, +10 volts at the node N-2 of the module M-2 and +5 volts at the node N-2 of the module M-3. These three voltages signify respectively that point $x=0.5$ is displaced upward by 30 units or .3 inch, point $x=1.5$ is displaced upward by 10 units or .1 inch and that point $x=2.5$ is displaced upward by 5 units or .05 inch two seconds after the initial displacement of the left end of the string 200.

The procedure is continued in this manner with the switches 7P at each of the three node modules M1 through M3 being stepped, the galvanometers 8M being balanced and readings being taken at the nodes N-2 until a sufficient number of time steps have been traversed to get a useful answer.

Automatic Operation

In order to provide for the automatic operation of the computer, servo motors 300 (FIGURE 4b) are utilized to perform the balancing operation. The servo motors 300 which are shown in phantom are self balancing servos which successively balance the potentials at point A (FIGURE 4b) from the potentiometers 4P, 5P and 6P with the potentials at node N-2, and adjust the respective potentiometers in accordance therewith. Only one of the potentiometers in each of the modules M1, M2 and M3 is adjusted at any one time. When the self balancing servos are utilized, the meter 8M is not utilized for the balancing operation. This may be accomplished using only one servo motor per node module and by coupling the shaft of this motor to whichever of the three potentiometers 4P, 5P and 6P is to be balanced.

A recorder 302 coupled to the node N-2 is utilized to record the potentials thereat. The recorder 302 and a control circuit 303 are both controlled by a programmer 304. The recorder 302 is operated after a potentiometer adjustment, and the control circuit 303 is operated after a recording operation. The control circuit 303 steps the switch 7P to the next time epoch and the sequence is repeated.

The recorder 302 and the programmer 304 may be equipment utilized in common by all the node modules. Instead of recording equipment alone the recorder 302 may represent analog to digital converting equipment for supplying the information as a direct input for a digital computer.

Suitable equipment for use in automatic operation is discussed on page 249 of my book "Analog Simulation." Such equipment may be also purchased from Leeds and Northrop and the Brown Instrument Division of Minneapolis-Honeywell Regulator Company and are known as self-balancing potentiometers.

Two and Three Dimensional Fields

For sake of simplicity, the above discussion has been limited to field problems containing only one independent space variable. The extension of this method to problems formulated in two and three space dimensions is very straightforward. The Laplacian operator in Equations 1 through 7 then becomes, for 2 and 3 dimensions, respectively $$\nabla^2\phi = \frac{\partial^2\phi}{\partial x^2} + \frac{\partial^2\phi}{\partial y^2}, \nabla^2\phi = \frac{\partial^2\phi}{\partial x^2} + \frac{\partial^2\phi}{\partial y^2} + \frac{\partial^2\phi}{\partial z^2} \quad (21)$$

The finite difference grid of FIGURE 1 is then modified to extend in three or four directions (space variables+time variable). The second derivatives with respect to $y$ and $z$ are approximated by finite difference expressions similar to those of Equation 14. Equation 17, in the case of the simple wave equation, is then modified by the addition of these terms. Such an analog circuit for a typical node then has positive and negative resistors extending to 10 or 14 adjacent node points for two and three dimensional problems respectively. The method of solution remains essentially unchanged. Similar extensions can be effected for the treatment of the biharmonic equation and the diffusion equation. In each case, the method described above is modified by including node units extending in the $y$ and possibly the $z$ directions, as well as the $x$ direction. The individual node circuits are modified only in that additional input resistors connecting point 0 with adjacent nodes in the $y$ and possibly the $z$ direction are used.

Non-Cartesian Coordinate Systems

The treatment of curvi-linear coordinate systems as, for example, cylindrical or spherical coordinates, is also quite straightforward. The Laplacian operator $\nabla^2$ is expanded in finite difference form, again using second central difference approximations, as above. Again, all finite difference expressions are reformulated as differences with respect to point 0, and each term in the equation is regarded as a current input to a typical node. Positive and negative resistors are then used to cause such currents to flow. In the case of non-cartesian coordinate systems, the specified magnitudes of these currents would generally be a function of the position of the point in question within the field (i.e., its distance from the origin).

*Time-Varying Parameters*

The variation of field parameters with time is very readily accommodated by the computer of this invention. Since the solution proceeds in discrete time steps, it is a simple matter to vary the network resistors after each step, in accordance with the variation of the field parameters. The magnitudes of the positive and negative network resistors at a specific node reflect the magnitudes of the field parameters in the corresponding vicinity of the field. These resistors are then adjacent in a stepwise manner as the computation progresses.

*Non-Linear Parameters*

Non-linearities in the field parameters is reflected in the analog by non-linearities in the network resistors. Such non-linearities can be accommodated with undue difficulty by making corresponding adjustments in the network resistors after each step in the computation.

*Equations Other Than the Wave Equation*

For other equations a procedure similar to that described above is utilized. The various plug connections are established and plug-in resistors inserted in accordance with the particular problem. The switch 18 is set in accordance with the particular equation utilized to solve the problem. The various steps for setting up the computer are then the same. FIGURE 10 illustrates the setup of the module for solving the biharmonic equation. As indicated also by the simplified version of the node module for the biharmonic equation in FIGURE 7, ten resistors terminate at the node N–O, six of which are negative resistors. When the node module is utilized for the biharmnic equation, the switch 123 may be operated to reverse the polarity of the output of the amplifier for positive inputs if it is so required by the polarity of the terms in the finite difference expression. The operation of the switch 123 was described above.

FIGURE 5 illustrates the simplified module for the diffusion equation. Each node module has two nodes N–0 and N–2 as the node N–5 is not required. For position 4 of the switch 18, the node N–5 and the potentiometer 6P are not utilized. The sequence of operations is the same except now it is a two-step instead of a three-step operation because the potentiometer 6P is non-functional. FIGURE 14 illustrates the setup of the general purpose node module for solving the diffusion equation.

The simulation of field governed by equations in which time is not an independent variable is accomplished with switch S18 in position 6—the "static" position. For example, to simulate Poisson's equation $$\frac{\partial^2 \phi}{\partial x^2} = K$$

switch 18 is placed in position "stat," and switch S7 is placed in position 1. The connection of a typical node module is shown in FIGURE 15. Feedback resistor 19 is now connected across the amplifier 1A. The bias voltage necessary to force a current proportional to K into node N–0 is supplied by potentiometer 6 through amplifier 1A, and resistors 100, 19 and 42. Resistors 29 and 30 are used to connect the module to adjacent node modules. Since there is a steady state problem, switch 7 need not be stepped to obtain successive solutions for different time epochs.

It is evident that the node modules M1, M2 are readily set up to simulate any of the partial differential equations utilized to solve transient field problems. Although this application has been disclosed and illustrated with reference to particular applications, the principles involved are susceptible of numerous other applications which will be apparent to persons skilled in the art. For example, other types of equations may be solved, or other specific electronic components utilized in the modules. AC signals could be utilized instead of D.C. signals so that cheaper amplifiers could be utilized. The invention is, therefore, to be limited only as indicated by the scope of the appended claims.

I claim:

1. A computer for solving transient field problems, including, a plurality of node modules for simulating the characteristics of points in the field, each of said node modules including a number of circuit nodes representing the characteristics of a point in the field at successive time epochs, adjustable circuit means coupled to said circuit nodes of some of said node modules for introducing electrical signals representing boundary conditions, and adjustable means selectively interconnecting said circuit nodes in each of said node modules with one another and with the circuit nodes in the other of said modules and with the adjustable circuit means representing the boundary conditions in accordance with the requirements of particular field problems to obtain variations in the electrical signals at the circuit nodes at successive discrete intervals of time in representation of the solution of the particular field problems at the different field points at the successive instants of time.

2. A computer for solving transient field problems in accordance with claim 1 wherein said inter-connected adjustable means includes positive resistor means, and negative resistor means.

3. A computer for solving transient field problems in accordance with claim 1 wherein each of said node modules also includes electrical control means for introducing signals to some of said circuit nodes in the module which signals represent initial conditions at the successive time epoch, and means coupled to one of said circuit nodes which does not receive the signals representing initial conditions for balancing the potential thereat with a potential at one of said circuit nodes receiving the signals from said electrical control means whereby the balanced potential at said one circuit node represents one part of the solution of the problem.

4. A computer for solving transient field problems in accordance with claim 1 wherein each of said node modules also includes electrical control means selectively connectable to said circuit nodes in said module for introducing signals to some of said circuit nodes in the module which signals represent initial conditions at the successive time epochs, circuit means selectively connectable to any one of said circuit nodes in said module for balancing the potential thereat with a potential at one of said circuit nodes receiving the signals from said electrical control means whereby the balanced potential at said one circuit node represents one part of the solution of the problem, and selective connecting means for switching the balanced potential representing one part of the solution from said one circuit node to a different one of the circuit nodes where it functions as an initial condition for the next part of the solution of the problem.

5. A computer for solving transient field problems in accordance with claim 4 wherein said circuit means for balancing the potential includes servos which operate said selective connecting means when the potentials are balanced to provide for the automatic operation of said computer.

6. A general purpose transient field simulator for solving transient field problems of the type described by the wave, diffusion and biharmonic equations and modified forms thereof, including, circuit means forming node modules representing the characteristics of discrete points in the field of a problem to be solved, said circuit means including resistive elements arranged in an electrical network described by node equations which are similar to the finite difference expression of the equation describing the characteristics of the field wherein both the time as well as the space variables of the equation describing the characteristics of the field are approximated by finite difference expressions, control means coupled to some of said node modules formed by said circuit means for introducing selective signals representing the boundary conditions of the transient field problem to be solved, and means interconnecting the resistive elements in each node module and interconnecting the resistive elements in the different node modules to obtain an interrelationship of the different field points in space and in time.

7. A general purpose transient field simulator in accordance with claim 6, including, in addition, electrical control means coupled to each of said electrical networks formed by said resistive elements for introducing selective signals representing the initial conditions at the successive time epochs of the transient field problem to be solved.

8. A general purpose transient field simulator in accordance with claim 6 wherein first particular ones of said resistive elements are positive resistors and second particular ones of said resistive elements are negative resistors.

9. A computer for solving transient field problems, including, a plurality of node modules for simulating the characteristics at particular time epochs of points in the field of a transient field problem to be solved, each of said node modules including adjustable resistance means for adjusting the duration of the interval between time epochs represented by said node modules, means connecting said node modules in a coordinate array to electrically simulate the characteristic of a plane at discrete points in the field of a transient field problem to be solved, control circuit means coupled to particular node modules of said coordinate array for introducing electrical signals representing the boundary condition of a transient field problem, and means coupled to each of said node modules in said coordinate array for providing a shift of the signals between said node modules in a particular interrelationship at times corresponding to the successive epochs to provide for each of the following epochs signals representing characteristics of the points simulated by the node modules.

10. A computer for solving transient field problems, including, a plurality of node modules for simulating the characteristics of points in the field, each of said node modules including a first circuit node representing the characteristics of a particular point at particular time epochs and also including a second circuit node representing the characteristics of the same particular point as said first circuit and also at particular time epochs following an initial time epoch represented by said first circuit node, an adjustable resistance device connecting said first circuit node to said second circuit node in each of said modules and having a value dependent upon the duration between the time epochs represented at said first and said second circuit nodes and upon the particular transient field problem being solved, each of said node modules also including a third circuit node representing the characteristics of the same particular point as said first circuit node and also at particular time epochs preceding the initial time epoch represented by said first circuit node, an adjustable resistance device connecting said first circuit node to said third circuit node in each of said modules and having a value dependent upon the duration between the time epochs represented at said first and said third circuit means and upon the particular transient field problem being solved, and means connecting said first circuit node in each of said node modules to said second and to said third circuit node of another one of said node modules to control the advance of signals between the different circuit nodes at the successive time epochs.

11. A computer for solving transient field problems, including, a plurality of node modules for electrically simulating the characteristics of different points in the field, each of said node modules including positive resistance means, negative resistance means, and switching means for selectively connecting said positive and said negative resistance means in predetermined arrays in accordance with the type transient field problem to be solved, each of said node modules also including adjustable circuit means for registering the initial conditions at successive time epochs of the particular transient field problem to be solved in the form of electrical signals, and means for selectively connecting said positive and said negative resistance means of each of said node modules to said positive and said negative resistance means of others of said node modules.

12. A computer for solving field problems, including a plurality of node modules for electrically simulating the characteristics of different points in the field, each of said node modules including positive resistance means, negative resistance means, and switching means for selectively connecting said positive and said negative resistance means in predetermined arrays in accordance with the type of transient field problem to be solved, said negative resistance means including one amplifier, and a number of input resistors for simulating a number of negative resistors.

13. A general purpose computer for solving transient and static field problems, including, a plurality of node modules for electrically simulating the characteristics of different points in the field, each of said node modules including a plurality of inter-connectable impedance elements, switching means having one condition inter-connecting said impedance elements in a first predetermined array simulating a static field and having a second condition inter-connecting said impedance elements in a second predetermined array simulating a transient field, and means operatively coupled to the impedance elements in the node modules and to the switching means in the second condition of the switching means for obtaining a transfer of signals between different impedance elements in the node modules at progressive instants of time to simulate the transient field at successive discrete instants of time.

14. A computer for solving transient field problems, including, a plurality of node modules for simulating the characteristics of points in the field, each of said node modules including a first circuit node representing the characteristics of a particular point at particular time epochs, a second circuit node representing the characteristics of the same particular point as said first circuit represents and also at particular time epochs following an initial time epoch represented by said first circuit node, an adjustable negative resistance device connecting said first circuit node to said second circuit node having a value determined by the duration between the time epochs represented at said first and said second circuit nodes, resistance means connecting said first circuit node in each of said node modules to said second circuit node of another one of said node modules, and a high gain amplifier arrangement connected between said first circuit node and said second circuit node for controlling the potential at said second circuit node.

15. A general purpose computer for solving transient field problems in accordance with the value of signals at discrete field points in the field at progressive discrete instants of time, including, a plurality of node modules each simulating a different field point in the field problems and each including a plurality of circuit nodes representing a particular field point at the progressive discrete instants of time, means interconnecting the different node modules in accordance with the particular field problems being solved to obtain the production of signals at particular circuit nodes in each node module in accordance with the signals at the different circuit nodes in the node modules in the plurality, and means intraconnecting the different circuit nodes in each node module to obtain an advance of the signals between the different circuit nodes in each node module at the progressive discrete instants of time to represent initial values of the discrete field point simulated by that node module for the production of further signals in that node module to represent the value of that field point at progressive instants of time.

16. The computer set forth in claim 15, including, means connected to the circuit nodes in particular ones of the node modules for introducing to such circuit nodes signals representing the initial conditions at each discrete time interval for the transient field problem being solved.

17. In a general purpose computer for solving transient field problems in accordance with the value of signals at discrete field points in the field at progressive discrete instants of time, a node module representing a particular discrete field point and including a plurality of circuit nodes interrelated to produce signals representing the value of the particular field discrete point at the progressive discrete intervals of time, means operatively coupled to the circuit nodes in the node module for advancing the signals at the circuit nodes to progressive ones of the circuit nodes in the plurality to provide at each progressive discrete instant of time values representing the particular field point at preceding discrete intervals of time, and means operatively coupled to the circuit nodes in the node module for introducing signals to the circuit nodes at each progressive discrete time interval in representation of boundary conditions controlling the operation of the node module in that time interval.

18. In a general purpose computer for solving transient field problems in accordance with the value of signals at discrete field points in the field at progressive discrete instants of time, a node module representing a particular discrete field point in the field and including a plurality of circuit nodes each representing the value of the particular discrete field point at a different discrete instant of time, each of the circuit nodes being constructed and being provided with parameters in accordance with the particular transient field problem being solved and in accordance with the number of discrete instants of time, means interconnecting the circuit nodes in the node module in accordance with the particular transient field problem being solved, and means operatively coupled to the circuit nodes in the node module for obtaining an advance of the signals between progressive ones of the circuit nodes in the node module at the progressive instants of time in representation of the prior values of the particular discrete point to control the production of subsequent values of the discrete point, and means operatively coupled to the circuit nodes in the node module for obtaining the production at particular ones of the nodes of signals representing the values of the discrete point at the successive discrete instants of time in accordance with the signals at the circuit nodes representing the value of the discrete point at the prior instants of time.

19. The computer set forth in claim 18, including, means operatively coupled to the circuit nodes in the node module for introducing to the circuit nodes signals representing the initial conditions for the discrete field point simulated by the node module at each progressive discrete interval of time.

20. A computer for solving transient field problems, including, a plurality of node modules for simulating the characteristics of discrete points in the field, each of said node modules including a plurality of circuit nodes electrically representing the characteristics of the same discrete point in the field at a plurality of successive discrete time epochs, resistance means intraconnecting said circuit nodes in each of said modules and also interconnecting circuit nodes to said circuit nodes in others of said node modules to form an electrical circuit array having electrical characteristics simulating the characteristics at discrete field positions of the field of a particular transient field problem at successive discrete intervals of time, input circuit means connected to first particular ones of said circuit nodes of each of said node modules for introducing electrical signals representing initial conditions of the particular transient field problem to said first particular ones of said circuit nodes, and output circuit means connected to a second particular one of said circuit nodes in each of said node modules for producing electrical signals representing at successive discrete intervals of time the characteristics of particular discrete points in the field of the particular transient field problem as represented by said transient node.

21. A computer in accordance with claim 20 wherein each of said node modules includes amplifier means between particular ones of the circuit nodes in the modules to maintain the potentials at said circuit nodes independent of the signal at the circuit nodes in any other of said node modules.

22. A computer for solving transient field problems, including, a plurality of node modules for simulating the characteristics of points in the field, each of said node modules including a first circuit node representing the characteristics of a particular point at particular time epochs and also including a second circuit node representing the characteristics of the same particular point as said first circuit and also at particular time epochs following an initial time epoch represented by said first circuit node, an adjustable resistance device connecting said first circuit node in each node module to said second circuit node in that node module and provided with a value dependent upon the duration between the time epochs represented at said first and said second circuit nodes and upon the particular transient field problem being solved, and resistance means connecting said first circuit node in each of said node modules to said second circuit node of another one of said node modules and provided with values dependent upon the particular transient field problem being solved and upon the particular field points in the particular transient field problem.

References Cited in the file of this patent

UNITED STATES PATENTS

| 2,569,646 | Wade et al. | Oct. 2, 1951 |
| 2,857,099 | Liebmann | Oct. 21, 1958 |

FOREIGN PATENTS

| 605,822 | Great Britain | July 30, 1948 |

OTHER REFERENCES

Howe et al.: "The Solution of Partial Differential Equations by Difference Methods Using the Electronic Differential Analyzer," Proceedings of Western Joint Computer Conference, Feb. 4–6, 1953, pp. 208–223.

Liebmann: "A New Electrical Analog Method for the Solution of Transient Heat-Conduction Problems," Trans. of the ASME, vol. 78, 1956, pp. 655 to 665.